US011431275B2

(12) United States Patent
Singh et al.

(10) Patent No.: US 11,431,275 B2
(45) Date of Patent: Aug. 30, 2022

(54) MOTOR CONTROL SYSTEM HAVING REDUNDANT ELECTRIC CONTROL UNIT

(71) Applicant: MANDO CORPORATION, Gyeonggi-do (KR)

(72) Inventors: Anant Singh, Bay City, MI (US); Tomy Sebastian, Bay City, MI (US); Ramakrishnan Rajavenkitasubramony, Bay City, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/367,563

(22) Filed: Jul. 5, 2021

(65) Prior Publication Data
US 2022/0014140 A1    Jan. 13, 2022

Related U.S. Application Data

(60) Provisional application No. 63/049,109, filed on Jul. 7, 2020.

(51) Int. Cl.
*H02P 29/028* (2016.01)
*H02P 27/08* (2006.01)
*H02P 25/22* (2006.01)

(52) U.S. Cl.
CPC ............ *H02P 29/028* (2013.01); *H02P 25/22* (2013.01); *H02P 27/08* (2013.01)

(58) Field of Classification Search
CPC .......... H02P 27/00; H02P 27/04; H02P 27/06; H02P 27/10; H02P 29/00; H02P 29/024; H02P 29/026; H02P 25/00; H02P 25/022; H02P 25/062; H02P 25/064; H02P 1/00; H02P 1/04; H02P 1/16; H02P 1/18; H02P 1/24; H02P 1/26; H02P 1/265; H02P 1/42; H02P 1/46; H02P 1/465; H02P 1/54; H02P 3/00; H02P 6/00; H02P 6/005; H02P 6/24; H02P 6/28; H02P 7/00; H02P 7/29;
(Continued)

(56) References Cited

U.S. PATENT DOCUMENTS 8,165,743 B2 *   4/2012  Oyama ................... B60L 50/61
                                            701/99
10,864,937 B2 * 12/2020  Yamamoto ........... B62D 5/0484

* cited by examiner

*Primary Examiner* — Antony M Paul
(74) *Attorney, Agent, or Firm* — Ladas & Parry, LLP

(57) ABSTRACT

A motor control system comprises: a motor; power sources; electric control units (ECUs) connected with the motor, each of ECUs comprising an inverter connected with a respective power source; and a controller monitoring whether an abnormality is detected in a voltage supplied to ECU(s). When the abnormality is detected in the voltage supplied to non-active ECU, the controller isolates current of active ECU to an inverter of active ECU to prevent high voltage spike caused by uncontrolled current flowing from active ECU to non-active ECU having the abnormality, and after the current of active ECU is isolated, electrically disconnects non-active ECU from active ECU and/or the motor. When the abnormality is detected in the voltage supplied to active ECU, the controller electrically disconnects active ECU from non-active ECU and/or the motor; and after active ECU having the abnormality is disconnected from non-active ECU and/or the motor, activates non-active ECU.

20 Claims, 17 Drawing Sheets

(58) Field of Classification Search
CPC .. H02P 9/00; H02P 11/00; H02P 21/00; H02P 21/22; H02P 23/00; H02P 23/28
See application file for complete search history.

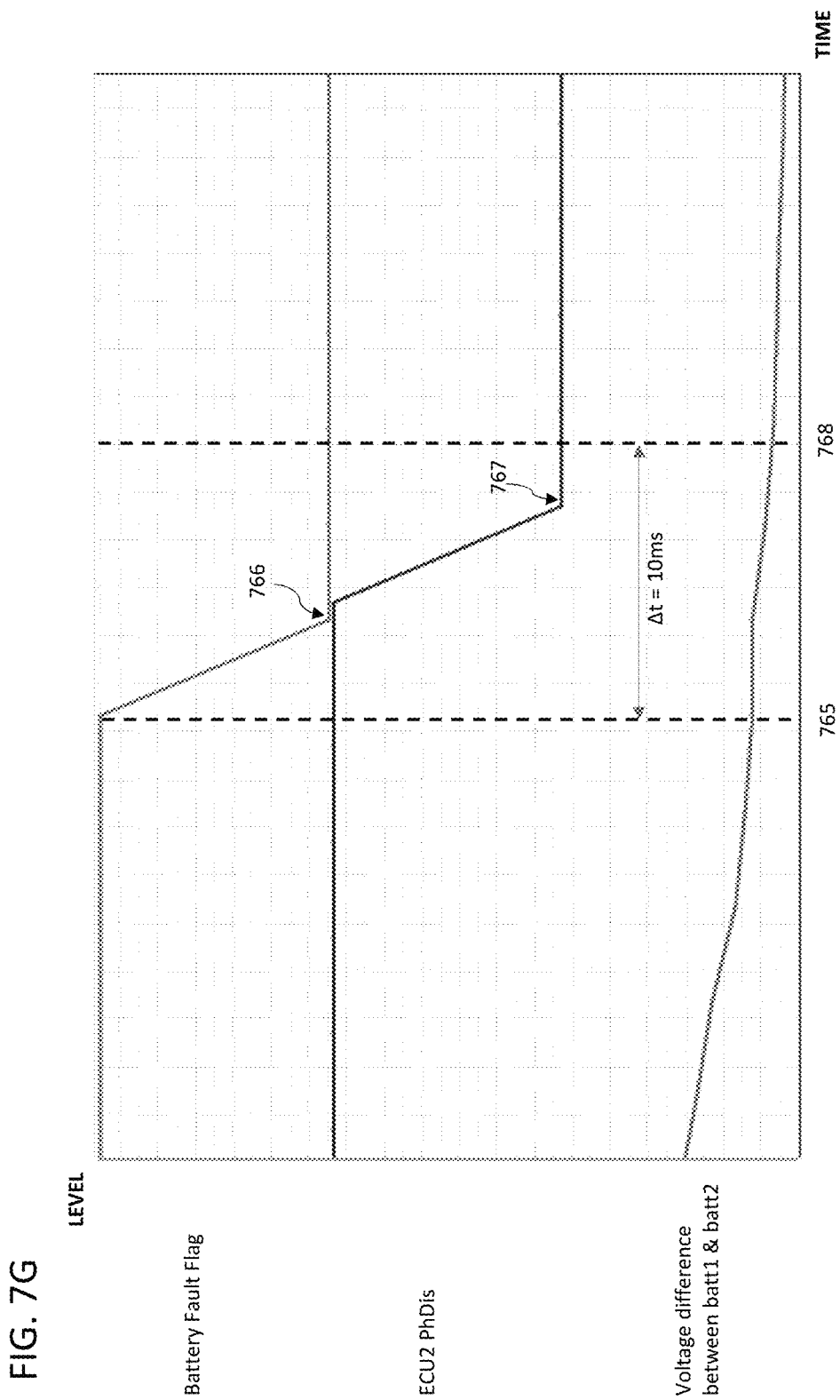

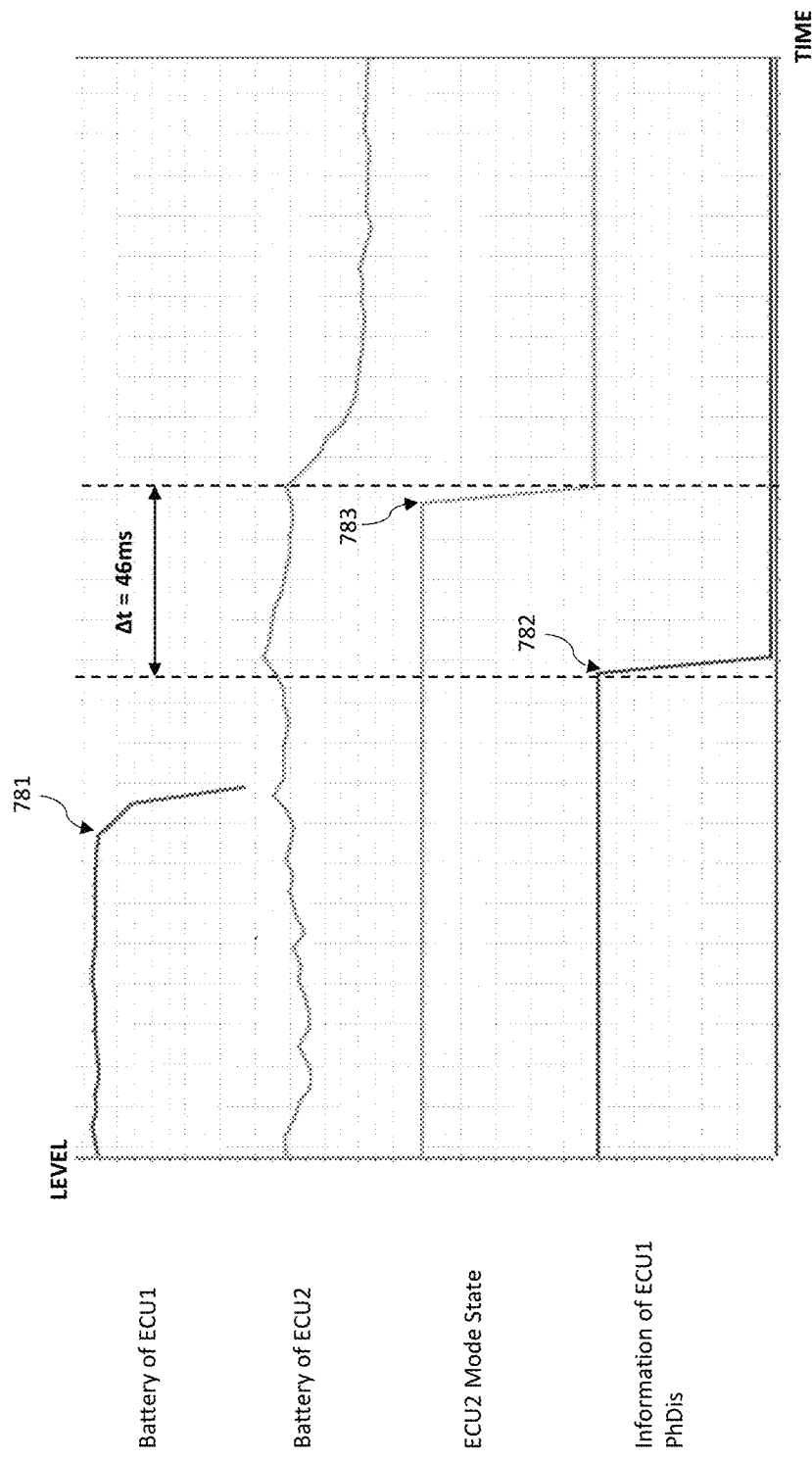

MOTOR CONTROL SYSTEM HAVING REDUNDANT ELECTRIC CONTROL UNIT

CROSS REFERENCE TO RELATED PATENT APPLICATION(S)

This application claims the priority and benefit of U.S. Patent Application Ser. No. 63/049,109, filed on Jul. 7, 2020, entitled "Battery Short/Open Protection for a redundant inverter system with single machine with dual battery source", which is all hereby incorporated herein by reference in its entirety.

BACKGROUND

The present disclosure generally relates to a system, apparatus and method for controlling a motor. More specifically, some embodiments of the present disclosure relate to a motor control system providing a redundancy failsafe for electronic control units (ECUs) operating a motor in a vehicle.

Increasing vehicle safety requirements are driving system redundancy to achieve higher safety levels. Redundancy is achieved by including a backup (or slave) component for taking over operations in case a primary (or master) component experiences a failure. For example, a first ECU that operates as a primary ECU of a motor control system sends a motor command to a motor to generate torque under a normal situation. A second ECU that operates as a backup for the first ECU monitors the first ECU for a failure, and in response to detecting the failure at the first ECU, the second ECU initiates to operate as the primary ECU of the motor control system. However, if one of the ECUs has abnormality in its power source such as a battery, uncontrolled current may flow, causing components of the ECUs to be damaged or operate incorrectly.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to various exemplary embodiments of the present disclosure, a motor control system may comprise: a motor comprising a plurality of motor windings; a plurality of power sources; a plurality of electric control units electrically connected with the motor to control the motor, each of the electric control units comprising an inverter electrically connected with a respective power source, wherein the plurality of electric control units comprise active and non-active electric control units; and one or more controllers configured to: monitor whether an abnormality is detected in a voltage supplied to die non-active electric control unit; in response to a detection that the abnormality is detected in the voltage supplied to the non-active electric control unit, isolate current of the active electric control unit to an inverter of the active electric control unit; and after the current of the active electric control unit is isolated to the inverter of the active electric control unit, electrically disconnect the non-active electric control unit from the active electric control unit and/or the motor. In the exemplary embodiments, before electrically disconnecting the non-active electric control unit having the abnormality from the loop of the motor control system, the current generated by the active electric, control unit needs to be isolated from the non-active electric control unit first to prevent from generating high voltage spike caused by the uncontrolled current flowing from the active electric control unit to the non-active electric control unit having the abnormality.

The one or more controllers may be further configured to, after the non-active electric control unit is electrically disconnected from the active electric control unit and/or the motor, release the active electric control unit from the isolation of the current of the active electric control unit to the inverter of the active electric control unit so that the active electric control unit can start to control the motor.

The one or more controllers may be configured to: monitor a difference between a voltage supplied to the active electric control unit and the voltage supplied to the non-active electric control unit; and determine that, if the difference between the voltage supplied to the active electric control unit and the voltage supplied to the non-active electric control unit is greater than a predetermined threshold, the abnormality is detected in the voltage supplied to the non-active electric control unit. Alternatively, the one or more controllers may be configured to determine that, if the voltage supplied to the non-active electric control unit is less than a predetermined threshold, the abnormality is detected in the voltage supplied to the non-active electric control unit.

Each of the electric control units may comprise a phase disconnector connected between the motor and the inverter of each of the electric control units. The one or more controllers may be configured to, after the current of the active electric control unit is isolated to the inverter of the active electric control unit, open the phase disconnector of the non-active electric control unit to electrically disconnect the non-active electric control unit from the active electric control unit and/or the motor.

The one or more controllers are configured to, in response to the detection that the abnormality is detected in the voltage supplied to the non-active electric control unit, make a duty cycle of the active electric control unit zero to isolate the current of the active electric control unit to the inverter of the active electric control unit. For example, each of the electric control units comprises first switches and second switches, wherein a respective one of the first switches and a respective one of the second switches are paired with each other, and a respective one of the motor windings is connected to between a respective one of the first switches and a respective one of the second switches, and the one or more controllers are configured to, in response to the detection that the abnormality is detected in the voltage supplied to the non-active electric control unit, close the second switches of the active electric control unit to isolate the current of the active electric control unit to the inverter of the active electric control unit.

The one or more controllers may be further configured to, in response to a determination that the detected abnormality in the voltage supplied to the non-active electric control unit is removed, restore electric connection of the non-active electric control unit to the active electric control unit and/or the motor.

The one or more controllers may be configured to, in response to a determination that the detected abnormality in the voltage supplied to the non-active electric control unit is removed, close the phase disconnector of the non-active electric control unit to electrically connect the inverter of the non-active electric control unit to the active electric control unit and/or the motor.

According to some exemplary embodiments of the present disclosure, a motor control system, may comprise: a motor comprising a plurality of motor windings; a plurality of power sources; a plurality of electric control units electrically connected with the motor to control the motor, each of the electric control units comprising an inverter electrically connected with a respective power source, wherein the plurality of electric control units comprises active and non-active electric control units; and one or more controllers configured to: monitor whether an abnormality is detected in a voltage supplied to the active electric control unit; in response to a detection that the abnormality is detected in the voltage supplied to the active electric control unit, electrically disconnect the active electric control unit from the non-active electric control unit and/or the motor; and after the active electric control unit having the abnormality is electrically disconnected from the non-active electric control unit and/or the motor, activate the non-active electric control unit so that the activated non-active electric control unit controls the motor.

Each of the electric control units may comprise a phase disconnector connected between the motor and the inverter of each of the electric control units, and the controller is configured to, in response to the detection that the abnormality is detected in the voltage supplied to the active electric control unit, open the phase disconnector of the active electric control unit to electrically disconnect the inverter of the active electric control unit from the non-active electric control unit and/or the motor.

The one or more controllers may be configured to: monitor a difference between a voltage supplied to the active electric control unit and the voltage supplied to the non-active electric control unit; and determine that, if the difference between the voltage supplied to the active electric control unit and the voltage supplied to the non-active electric control unit is greater than a predetermined threshold, the abnormality is detected in the voltage supplied to the active electric control unit. Alternatively, the one or more controllers may be configured to determine that if the voltage supplied to the active electric control unit is less than a predetermined threshold, the abnormality is detected in the voltage supplied to the active electric control unit.

According to certain exemplary embodiment of the present disclosure, a method for controlling a motor control system comprising a motor comprising a plurality of motor windings, a plurality of power sources, a plurality of electric control units comprising active and non-active electric control units and electrically connected with the motor to control the motor, each of the electric control units comprising an inverter electrically connected with a respective power source, may comprise: monitoring whether an abnormality is detected in a voltage supplied to the non-active electric control unit; in response to a detection that the abnormality is detected in the voltage supplied to the non-active electric control unit, isolating current of the active electric control unit to an inverter of the active electric control unit; and after the current of the active electric control unit is isolated to the inverter of the active electric control unit, electrically disconnecting the non-active electric control unit from the active electric control unit and/or the motor. In the exemplary embodiments, before electrically disconnecting the non-active electric control unit having the abnormality from the loop of the motor control system, the current generated by the active electric control unit needs to be isolated from the non-active electric control unit first to prevent from generating high voltage spike caused by the uncontrolled current flowing from the active electric control unit to the non-active electric control unit having the abnormality.

The method may further comprise, after the non-active electric control unit is electrically disconnected from the active electric control unit and/or the motor, releasing the active electric control unit from the isolation of the current of the active electric control unit to the inverter of the active electric control unit so that the active electric control unit controls the motor.

The monitoring of whether the abnormality is detected in the voltage supplied to the non-active electric control unit may comprise: monitoring a difference between a voltage supplied to the active electric control unit and the voltage supplied to the non-active electric control unit; and determining that, if the difference between the voltage supplied to the active electric control unit and the voltage supplied to the non-active electric control unit is greater than a predetermined threshold, the abnormality is detected in the voltage supplied to the non-active electric control unit.

Each of the electric control units may comprise a phase disconnector connected between the motor and the inverter of each of the electric control units, the electrically disconnecting of the non-active electric control unit from the active electric control unit and/or the motor may comprise, after the current of the active electric control unit is isolated to the inverter of the active electric control unit, opening the phase disconnector of the non-active electric control unit to electrically disconnect the non-active electric control unit from the active electric control unit and/or the motor.

The isolating of the current of the active electric control unit to the inverter of the active electric control unit may comprise, in response to the detection that the abnormality is detected in the voltage supplied to the non-active electric control unit, making a duty cycle of the active electric control unit zero.

Each of the electric control units may comprise first switches and second switches, wherein a respective one of the first switches and a respective one of the second switches are paired with each other, and a respective one of the motor windings is connected to between a respective one of the first switches and a respective one of the second switches, and the isolating of the current of the active electric control unit to the inverter of the active electric control unit may comprise, in response to the detection that the abnormality is detected in the voltage supplied to the non-active electric control unit, closing the second switches of the active electric control unit.

The method may further comprise, in response to a determination that the detected abnormality in the voltage supplied to the non-active electric control unit is removed, restoring electric connection of the non-active electric control unit to the active electric control unit and/or the motor.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which:

FIG. 7G illustrates exemplary CANape traces of Battery Fault Flag, ECU2 PhDis, and voltage difference between batt1 and batt2 according to an embodiment of the present disclosure in a case that ECU 1 is an active ECU and a non-active ECU 2 has been electrically disconnected due to its abnormality and then becomes recovered from the abnormality.

FIGS. 7H and 7I show exemplary time traces of voltages of power sources, phase disconnectors, an inverter gate driver of ECUs.

FIG. 7K illustrates exemplary CANape traces of voltages of batteries of ECUs 1 and 2, a mode state of ECU2, and ECU1 PhDis according to an embodiment of the present disclosure in a case that an active ECU becomes short-circuited.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
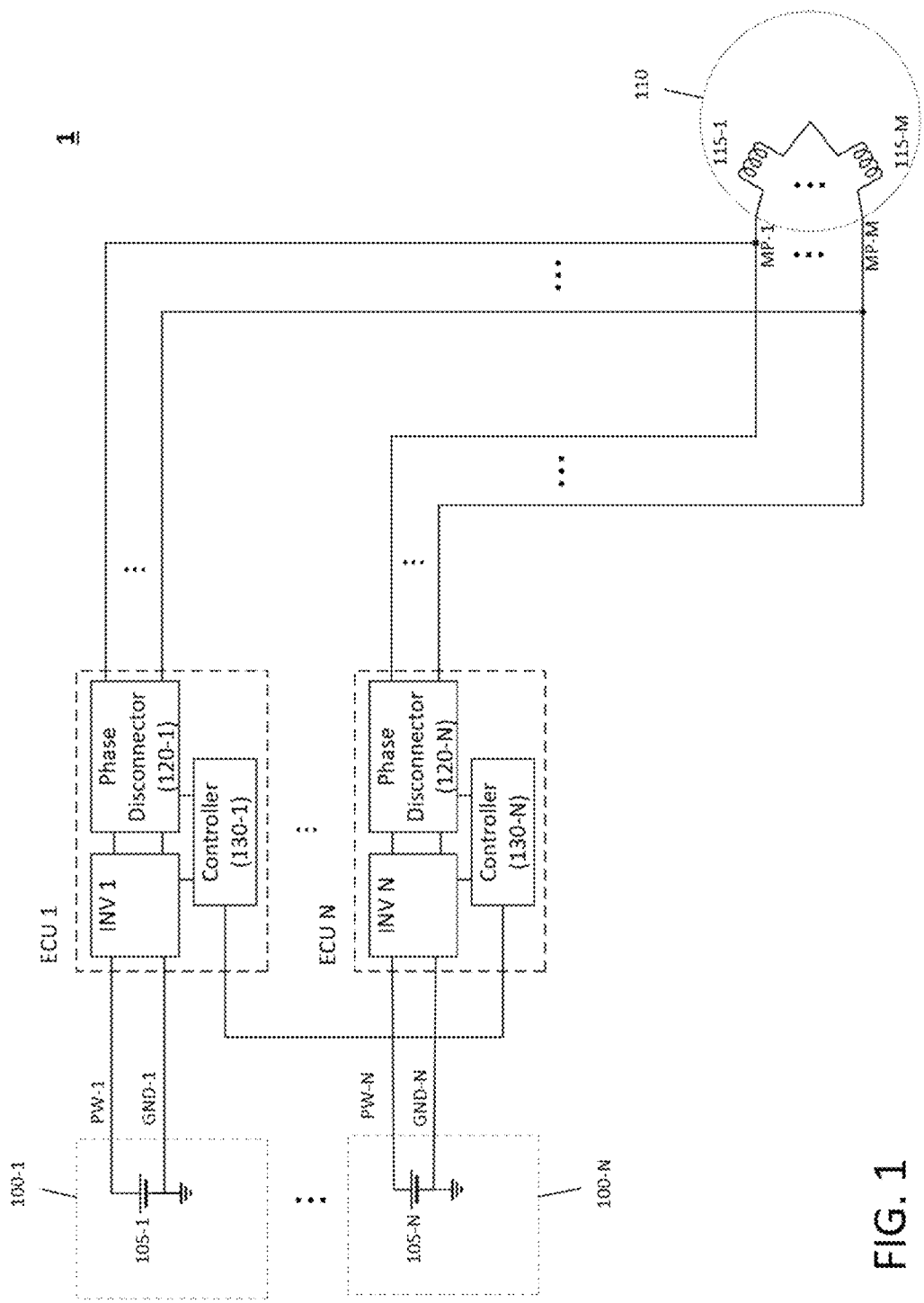
FIG. 1 is a schematic diagram of a motor control system according to an embodiment of the present disclosure.

Referring now to FIG. 1, a schematic diagram of a motor control system according to an embodiment of the present disclosure.

Power sources 100-1 to 100-N (N is a positive integer more than 1) are configured to supply power to a respective one of electric control units (ECUs) 1 to N. The power sources 100-1 to 100-N may be electrically connected to the ECUs 1 to N through power lines PW-1 to PW-N and ground lines GND-1 to GND-N, respectively. The power sources 100-1 to 100-N may be batteries 105-1 to 105-N, but not limited thereto.

A motor 110 may be, for example, but not limited to, a multi-phase motor comprising a plurality of motor windings 115-1 to 115-M (M is a positive integer more than 1). The motor 110 may have a plurality of motor phase terminals MP-1 to MP-M connected to a respective one of the motor windings 115-1 to 115-M. For example, the motor 110 may be a multi-phase AC permanent magnet motor. In an exemplary embodiment shown in FIG. 2, the motor 110 is illustrated as a three-phase permanent magnet motor having a U-phase winding 115-1, a V-phase winding 115-2, and a W-phase winding 115-3, but it should be appreciated that embodiments of the present disclosure should not be limited to such. One having ordinary skill in the art would understand that the present disclosure can be implemented with a two-phase motor or a more than three-phase motor.

The ECUs 1 to N comprise multi-phases (M-phases) inverters INVs 1 to N, respectively. The inverters INVs 1 to N are coupled to the motor phase terminals MP-1 to MP-M connected to a respective one of the motor windings 115-1 to 115-M. The inverters INVs 1 to N receive power from the power sources 100-1 to 100-N, and convert direct current (DC) voltage provided from the power sources 100-1 to 100-N to alternating currents (AC) voltage. The outputs generated by the inverters INVs 1 to N are applied to the motor windings 115-1 to 115-M through the motor phase terminals MP-1 to MP-M to drive the multi-phase (M-phase) motor 110.

The ECUs 1 to N comprise phase disconnectors 120-1 to 120-N. The phase disconnector 120-1 to 120-N may be connected between the inverter INV 1 to N and the motor 110. The phase disconnector 120-1 to 120-N is configured to selectively connect or disconnect the inverter INV 1 to N with the motor 110 and/or other inverters in response to a control signal of a controller 130-1 to 130-N.

Each of the ECUs 1 to N may have one or more controllers 130-1 to 130-N, for example, but not limited to, one or more of a circuit, microprocessor, computer or processor, which monitors and physically alters the operating conditions of a motor control system 1 and each of the ECUs 1 to N. Alternatively or additionally, one or more controllers (e.g. a main processor) which are not included in the ECUs 1 to N are electrically connected to the ECUs 1 to N and are configured to perform central control for the ECUs 1 to N. For instance, the main controller can control the ECUs 1 to N.

Figure 2:
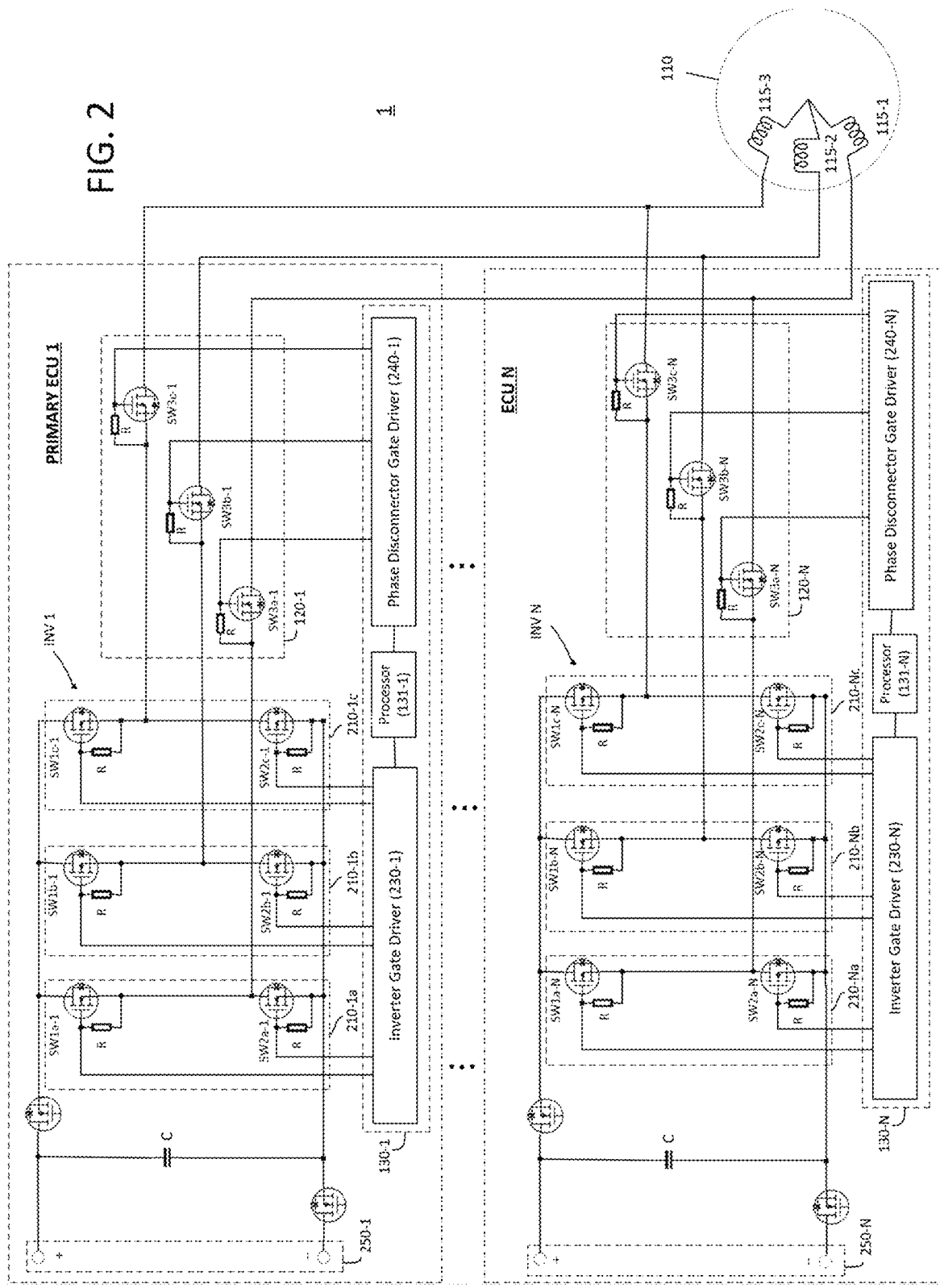
FIG. 2 is a conceptual circuit diagram of a motor control system according to an embodiment of the present disclosure.

FIG. 2 is a conceptual circuit diagram of a motor control system according to an embodiment of the present disclosure. It should be noted that a three-phase motor 110 in FIG. 2 is not limited to this implementation; rather, FIG. 2 is merely one example of how the three-phase motor 110 could be implemented in one implementation. One having ordinary skill in the art would understand that the present disclosure can be implemented with, a more than three-phase motor. In the exemplary embodiment of FIG. 2, it is assumed that ECU 1 is a primary (or master) ECU which is properly initialized or activated and is in an active status and ECUs 2 to N are back-up ECUs which are in a non-active or standby status. ECUs 2 to N operate as a backup for ECU 1 monitor ECU 1 for a failure, and if the failure or malfunction at ECU 1 is detected, one of ECUs 2 to N takes over the role of the primary or master ECU from ECU 1 and initiates to operate as the primary or master ECU controlling the motor 110.

DC bus 250-1 may be configured to supply power to the active ECU 1. The DC bus 250-1 may be connected to the power source 100-1 of FIG. 1. The power source may be, for example, but not limited to, one or more DC batteries, fuel cell(s), generator(s), power converter(s) or the like. For instance, a first node (e.g. a positive node or a high voltage node) of the DC bus 250-1 is connected to the battery 105-1 through the power line PW-1, and a second node (e.g. a negative node or a low voltage node) of the DC bus 250-1 is connected to the battery 105-1 through the ground line GND-1. C-1 is coupled in parallel with the power source 100-1 and may be used as a filter to reduce switching ripples on the power signal supplied to the inverter INV 1.

The active ECU 1 may comprise the inverter INV 1. The inverter INV 1 may be configured to provide controlled electric power with variable magnitude and frequency to the motor 110. The inverter INV 1 may comprise a first inverter sub-module 210-1a comprising a first switch SW1a-1 and a second switch SW2a-1, a second inverter sub-module 210-1b comprising a first switch SW1b-1 and a second switch SW2b-1, and a third inverter sub-module 210-1c comprising a first switch SW1c-1 and a second switch SW2c-1. The first switches SW1a-1, SW1b-1, SW1c-1 and the second switches SW2a-1, SW2b-1, SW2c-1 are organized in pairs with each pair connected to a respective motor phase. In this embodiment, in phase U the first inventor sub-module 210-1a is coupled to the motor winding 115-1, in phase V the second inventor sub-module 210-1b is coupled to the motor winding 115-2, and in phase W the third inventor sub-module 210-1c is coupled to the motor winding 115-3. As shown in FIG. 2, the motor windings 115-1, 115-2, 115-3 are connected together at a neutral point. The current into the motor winding 115-1 flows out the motor windings 115-2, 115-3, the current into the motor winding 115-2 flows out the motor windings 115-1, 115-3, and the current into the motor winding 115-3 flows out the motor windings 115-1, 115-2. And, the current out of the motor winding 115-1 flows into the motor windings 115-2, 115-3, the current out of the motor winding 115-2 flows into the motor windings 115-1, 115-3, and the current out of the motor winding 115-3 flows into the motor windings 115-1, 115-2.

The switches SW1a-1, SW1b-1, SW1c-1, SW2a-1, SW2b-1, SW2c-1 may be any suitable switching devices, such as metal-oxide-semiconductor field-effect transistors (MOSFETs) insulated gate bipolar transistors (IGBTs), or any other suitable power semiconductor or transistor devices. In the exemplary embodiment shown in FIG. 2, the switches SW1a-1, SW1b-1, SW1c-1, SW2a-1, SW2b-1, SW2c-1 are illustrated as a n-channel enhancement mode MOSFET, but not limited thereto. The switches SW1a-1, SW1b-1, SW1c-1, SW2a-1, SW2b-1, SW2c-1 may further include integrated free-wheeling diode. Alternatively, the freewheeling diodes may be provided separately and placed in parallel with the switches SW1a-1, SW1b-1, SW1c-1, SW2a-1, SW2b-1, SW2c-1.

The inverter INV 1 has three first switches SW1a-1, SW1b-1, SW1c-1 (upper side switches) and three second switches SW2a-1, SW2b-1, SW2c-1 (lower side switches) to appropriately switch voltage and provide three-phase energization of the motor windings 115-1, 115-2, 115-3 of the motor 110. A first terminal (e.g. drain) of the first switch SW1a-1, SW1b-1, SW1c-1 is connected with the first node (e.g. a high voltage node) of the DC bus 350-1, a second terminal (e.g. gate) of the first switch SW1a-1, SW1b-1, SW1c-1 is connected to an inverter gate driver 230-1, and a third terminal (e.g. source) of the first switch SW1a-1, SW1b-1, SW1c-1 is connected with a respective one of the second switches SW2a-1, SW2b-1, SW2c-1 and a respective one of the motor windings 115-1, 115-2, 115-3. A first terminal (e.g. drain) of the second switch SW2a-1, SW2b-1, SW2c-1 is connected with a respective one of the first switches SW1a-1, SW1b-1, SW1c-1 and a respective one of the motor windings 115-1, 115-2, 115-3, a second terminal (e.g. gate) of the second switch SW2a-1, SW2b-1, SW2c-1 is connected to the first switch driver (e.g. inverter gate driver) 230-1, and a third terminal (e.g. source) of the second switch SW2a-1, SW2b-1, SW2c-1 is connected with the second node (e.g. a low voltage node) of the DC bus 250-1. Further, resistors (or pull down resistors) R may be connected with the switches SW1a-1, SW1b-1, SW1c-1, SW2a-1, SW2b-1, SW2c-1. For example, the pull down resistor R may be connected between the second terminal (e.g. gate) and the third terminal (e.g. source) of the switch SW1a-1, SW1b-1, SW1c-1, SW2a-1, SW2b-1, SW2c-1.

The controller 130-1 may comprises the inverter gate driver 230-1, a processor 131-1, and a phase disconnector gate driver 240-1. Alternatively, the inverter gate driver 230-1 and the phase disconnector gate driver 240-1 may be integrated into the processor 131-1.

The inverter gate driver 230-1 is configured to control the first inverter INV 1 and render direction, torque or speed control output from the motor 110. The inverter gate driver 230-1 may accomplish this task using several tools and can include any suitable processor configured to execute control logic that may control the inverter INV 1 and the motor 110. The inverter gate driver 230-1 may be configured to generate drive signals and output the drive signals to the switches SW1a-1, SW1b-1, SW1c-1, SW2a-1, SW2b-1, SW2c-1 in order to control the on and off of the switches SW1a-1, SW1b-1, SW1c-1, SW2a-1, SW2b-1, SW2c-1 according to pulse width modulation (PWM) duty-cycle commands received from the processor 131-1. The drive signals of the first switch driver 230-1 may turn on or off the switches SW1a-1, SW1b-1, SW1c-1, SW2a-1, SW2b-1, SW2c-1 in order to regulate the fundamental component of the phase voltage of the motor 110 to a desired amplitude, phase, and frequency. The inverter gate driver 230-1 may also include any other suitable devices or modules, such as ancillary devices like clocks, power supplies, and the like. Moreover, any other suitable devices can be placed in communication with other components, such as one or more sensors, other controllers, or the like.

The processor 131-1 is a hardware device for executing instructions or software stored in memory. The processor 131-1 may be a central processing unit (CPU), an auxiliary processor among a several processors associated with the motor control system 1 or a vehicle, a semiconductor based microprocessor (in the form of a microchip or chip set), a microprocessor, or any other device for executing instructions. The processor 131-1 controls the inverter gate driver 230-1 and the phase disconnector gate driver 140-1.

The first inverter INV 1 may be connected to the motor 110 through the phase disconnector 120-1. For example, as shown in FIG. 2, the phase disconnector 120-1 may include third switches SW3a-1, SW3b-1, SW3c-1. The third switches SW3a-1, SW3b-1, SW3c-1 are connected between outputs of the invertor sub-modules 210-1a, 210-1b, 210-1c (e.g. a point between the first switch SW1a-1, SW1b-1, SW1c-1 and the second switch SW2a-1, SW2b-1, SW2c-1) and the motor windings 115-1, 115-2, 115-3, respectively. The phase disconnector gate driver 240-1 may be configured to generate control signals to the third switches SW3a-1, SW3b-1, SW3c-1 to turn on or off the third switches SW3a-1, SW3b-1, SW3c-1. First terminals (e.g. drain) of the third switches SW3a-1, SW3b-1, SW3c-1 are connected with the motor windings 215-1, 215-2, 215-3, respectively, second terminals (e.g. gate) of the third switches SW3a-1, SW3b-1, SW3c-1 are connected with the phase disconnector gate driver 240-1 to receive gate drive signals, and third terminals (e.g. source) of the third switches SW3a-1, SW3b-1, SW3c-1 are connected with the inverter sub-modules 310-1a, 310-1b, 310-1c, respectively. The resistor pull down resistor) R may be connected between the second terminal (e.g. gate) and the third terminal (e.g. source) of the third switches SW3a-1, SW3b-1, SW3c-1. When the third switches SW3a-1, SW3b-1, SW3c-1 are opened (e.g. turned off), the first inverter INV 1 of the active ECU 1 is electrically disconnected from the motor 110 and/or other ECUs 2 to N. However, when the third switches SW3a-1, SW3b-1, SW3c-1 are closed (e.g. turned on), the first inverter INV 1 of the active ECU 1 is connected with the motor 110 and/or other ECUs 2 to N. For instance, normally the third switches SW3a-1, SW3b-1, SW3c-1 are turned on, but only at predetermined conditions (such as preset failure conditions of the primary ECU 1) the phase disconnector gate driver 240-1 can turn off the third switches SW3a-1, SW3b-1, SW3c-1 to electrically disconnect the first inverter INV 1 of the active ECU 1 from the loop of the motor control system 1 such as the motor 110 and/or other ECUs 2 to N in order to protect the motor 210 and/or other ECUs 2 to N.

The motor control system 1 may have one or more additional ECUs 2 to N which are duplicates of ECU 1 described above. For example, the ECUs 2 to N can have the same or similar components, configurations, operation and connections as or to the primary ECU 1. The ECUs 2 to N-1 are redundancy of the primary ECU 1 to back up the primary ECU 1. When the primary ECU 1 is active, the active ECU 1 drives the motor 110 by sending a motor control command to the motor 110 and the first and second switches (e.g. SW1a-n to SW1c-n and SW2a-n to SW2c-n, n is a positive integer more than 1) included in ECUs 2 to N-1 may be turned off while the third switches (e.g. SW3a-n to SW3c-n, n is a positive integer more than 1) of the phase disconnectors 120-2 to 120-N comprised in the ECUs 2 to N may be turned on. The non-active ECUs 2 to N may monitor the active ECU 1 for a failure. In response to detecting the failure at ECU 1, one of ECUs 2 to N-1 takes over the role of the primary or master ECU from ECU 1 and operates as a primary or master ECU controlling the motor 110.

Figure 3:
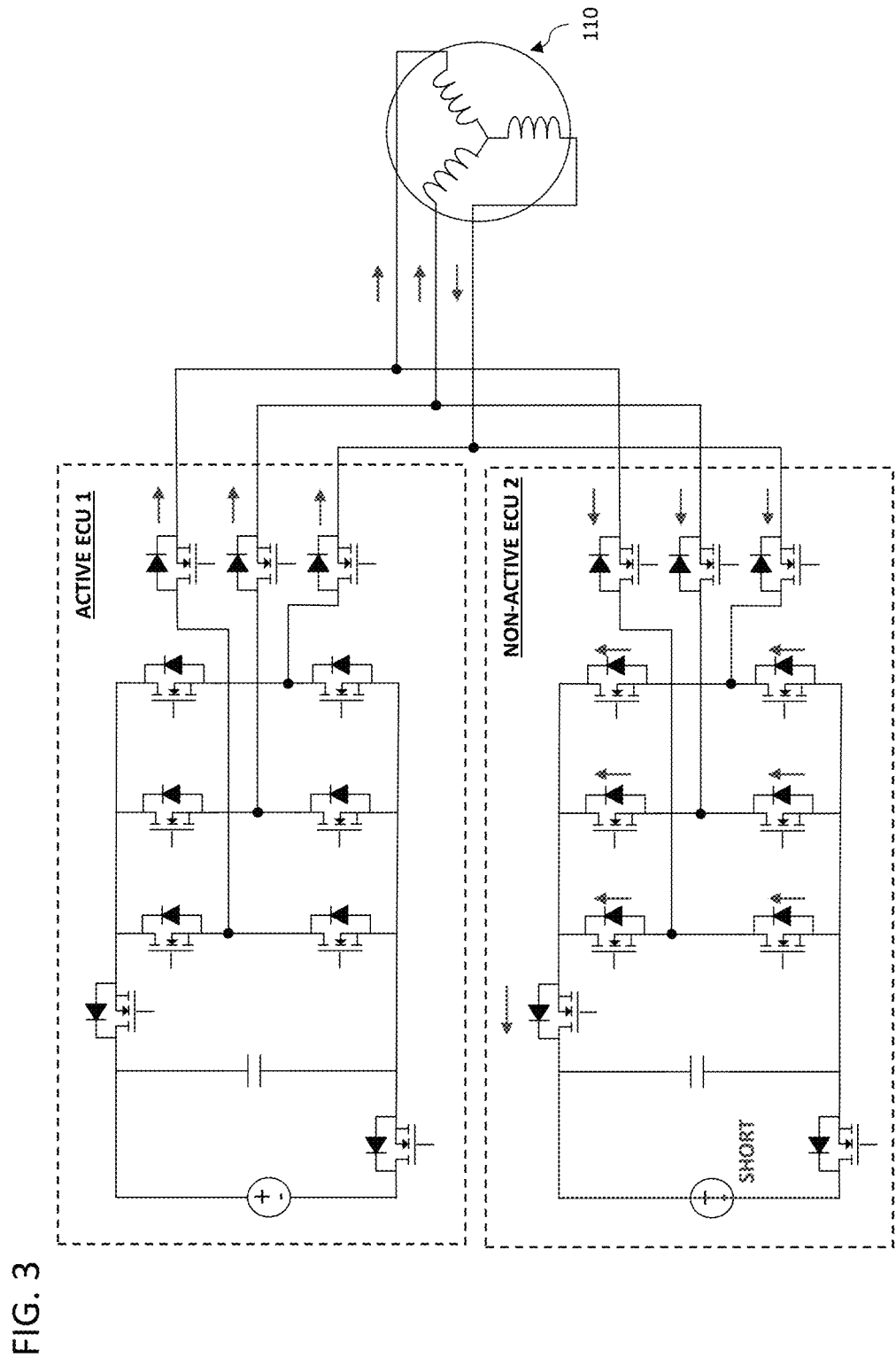
FIG. 3 illustrates current flows and 4 shows exemplary time traces of components of a motor control system in a case that a phase disconnector of a non-active ECU experiencing abnormality is opened to disconnect the non-active ECU from the loop of the motor control system without isolating a current of an active ECU to an inverter of the active ECU.

If the power source 100-n of a non-active ECU n (n is a positive integer more than 1) is shorted or open-circuited, the voltage of the power source 100-n of the non-active ECU n may be dropped, and this may cause the voltage difference between the active ECU (e.g. ECU 1) and the shorted or opened non-active ECU (e.g. ECU n, n is a positive integer more than 1). Then, the voltage of the power source of the active ECU becomes greater than the voltage of the power source of the shorted or opened non-active ECU by a certain voltage level, for example, but not limited to, around 2V, and then an uncontrolled current may flow from the active ECU to the non-active ECU because of the voltage difference as illustrated in FIG. 3. Therefore, in order to prevent the uncontrolled current flow, the shorted or opened ECU should be safely removed from the loop of the motor control system 1.

Figure 4:
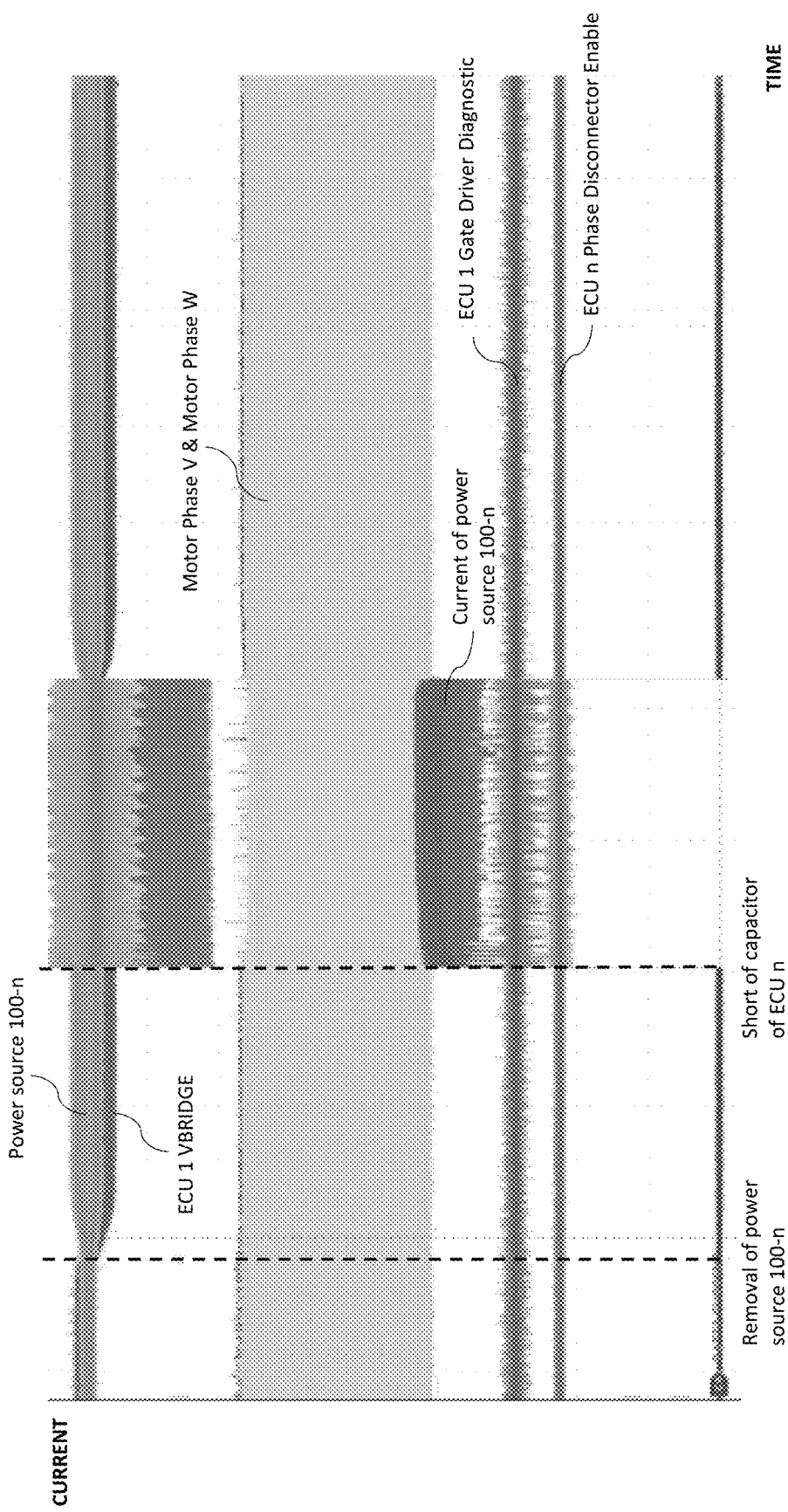

To remove the shorted or opened non-active ECU n from the motor control system 1 such as the motor 110 and/or the active ECU 1, the phase disconnector 120-n (e.g. third switches SW3a-n, SW3b-n, SW3c-n) of the shorted or opened non-active ECU n may be opened (e.g. turned off) to block the current therethrough. However, as shown in FIG. 4, the immediate opening of the phase disconnector 120-n (e.g. third switches SW3a-n, SW3b-n, SW3c-n) of the shorted or opened non-active ECU n may result in producing high voltage spike because voltage V becomes large when current 1 is not zero and time difference dt is small in $$V = L\frac{dI}{dt}.$$

This high voltage spike may cause the phase disconnector 120-n (e.g. third switches SW3a-n, SW3b-n, SW3c-n) to be damaged. The high voltage spike may also affect the active ECU 1 since the voltage spike can be occurred in the active ECU 1. For example, the microcontroller of the active ECU 1 may be damaged or may need to be reset. Therefore, before opening the phase disconnector 120-n (e.g. third switches SW3a-n, SW3b-n, SW3c-n) of the shorted or opened non-active ECU n, the current generated by the active ECU 1 needs to be isolated from the non-active ECU n first to prevent from generating high voltage spike caused by the uncontrolled current flowing from the active ECU 1 to the shorted or opened ECU n.

Figure 5:
FIG. 5 shows a flowchart for a method for controlling a motor control system according to an embodiment of the present disclosure.

FIG. 5 shows a flowchart for a method for controlling a motor control system according to an embodiment of the present disclosure. In the embodiment, a controller may be implemented as a single controller or a plurality of controllers. For example, as illustrated in FIGS. 1 and 2, the controller may be implemented as the plurality of controllers 130-1 to 130-N, and the controllers 130-1 to 130-N can transmit and receive signals to and from each other by using one or more various communication methods designed for inter-micro communications, such as the protocols SCI, CAN, and MLI. Alternatively, the controller can be a main-controller and/or a sub controller of the motor control system 1 or a vehicle, or combination of the plurality of controllers 130-1 to 130-N of FIGS. 1 and 2 and the main- and/or sub-controller(s).

At step 505, the controller may monitor voltages of the power source 100-1 of the active ECU 1 and/or the power source 100-n of the non-active ECU n (e.g. one of ECU 2 to N, n is a positive integer more than 1). For instance, the voltages of the power source 100-1 of the active ECU 1 and the power source 100-n of the non-active ECU n may be monitored by measuring the voltages at the DC bus 250-1 of the active ECU 1 and the DC bus 250-n of the non-active ECU n. In the exemplary embodiment, as described above with respect to FIGS. 1 and 2, under normal or initial conditions, ECU 1 is set as a primary or master ECU and ECU n is set as a back-up ECU.

At step 510, the controller may detect whether an abnormality is detected in a voltage which is supplied to the non-active ECU n by the power source 100-n. The abnormality detected at step 510 may be, for example, but not limited to, a status that a power source such as a battery is shorted or opened, or a case that an uncontrolled current flows from one ECU to another ECU.

For example, the controller detects whether the voltage difference between the power source 100-1 of the active ECU 1 and the power source 100-n of the non-active ECU n is greater than a threshold value to detect the abnormality in the voltage supplied to the non-active ECU n. The controller may determine if the voltage of the power source 100-1 of the active ECU 1 is greater than the voltage of the power source 100-n of the non-active ECU n by the threshold value. The threshold value can be set as a voltage difference between power sources that is capable of causing an uncontrolled current to flow from an active electric control unit to a non-active electric control unit. For example, the threshold value is preset to a voltage drop of diodes which are in a path from an inverter of an active electric control unit to a terminal of a non-active electric control unit connected to a power source. In the exemplary embodiment, the threshold value is a voltage drop of diodes which are in a path from the inverter INV 1 of the active ECU 1 to the DC bus 205-n of the non-active ECU n. The threshold value may be between 1.5V and 2.5V, preferably 2V, but not limited thereto.

Alternatively, to detect the abnormality in the voltage supplied to the non-active ECU n, the controller may detect whether the voltage of the power source 100-n of the non-active ECU n goes below a threshold value.

If at step 510 the abnormality is detected in the voltage supplied to the non-active ECU n, the controller may isolate current of the active ECU 1 to the inverter INV 1 of the active ECU 1, or divert the current from the non-active ECU n before removing ECU 2 having the abnormality (step 515). For example, the controller may make a duty cycle of the active ECU 1 zero, or close (e.g. turn on) the second (or lower side) switches SW2a-1, SW2b-1, SW2c-1 of INV 1 of the active ECU 1, in order to isolate the current of the active ECU 1 to the inverter INV 1 of the active ECU 1. The isolation of the current of the active ECU 1 to the inverter INV 1 of the active ECU 1 causes no current to flow from the active ECU 1 to the non-active ECU n. By isolating the current of the active ECU 1 to the inverter INV 1 of the active ECU 1 before opening the phase disconnector 120-n (e.g. third switches SW3a-n, SW3b-n, SW3c-n) of the non-active ECU n having the abnormality, the high voltage spike can be prevented because no uncontrolled current is able to flow from the active ECU 1 to the non-active ECU n.

At step 520, the controller may turn the active ECU 1 to a passive mode in order to ensure that no power is discharged out of the inverter INV 1 of the active ECU 1 and is fed to the non-active ECU n.

After a predetermined time is elapsed from initiating the isolation of the current of the active ECU 1 to the inverter INV 1 of the active ECU 1 at step 525, the controller may control the phase disconnector 120-n (e.g. third switches SW3a-n, SW3b-n, SW3c-n) of the non-active ECU n to electrically disconnect the shorted or opened non-active ECU n from the loop of the motor control system 1 such as the motor 110 and/or the active ECU 1 by opening (i.e. turning off) the phase disconnector 120-n (e.g. third switches SW3a-n, SW3b-n, SW3c-n) of the non-active ECU n (step 530). For instance, the predetermined time at step 525 is set to be equal to or longer than necessary or minimum time for the ECU 1's operation of isolating current of the active ECU 1 to the inverter INV 1 of the active ECU 1, or diverting the current from the non-active ECU n (for example, minimum operation time for closing or turning on the lower side switches SW2a-1, SW2b-1, SW2c-1 of INV 1 of the active ECU 1).

After the disconnection operation of the phase disconnector 120-n of the non-active ECU n is completed, the controller may change the status of the active ECU 1 from the passive mode to an active mode so that the active ECU 1 can resume a normal operation of controlling the motor 110 (step 535).

At step 540, the controller may check if the abnormality in the voltage, which is supplied to the non-active electric control unit ECU n by the power source 100-n, disappears. This can be determined by the voltages of the power source 100-1 of the active ECU 1 and/or the power source 100-n of the non-active ECU n in a similar way to step 510 described above. For example, the controller determines whether the voltage difference between the power source 100-1 of the active ECU 1 and the power source 100-n of the non-active ECU n is less than a threshold value, or whether the voltage of the power source 100-n of the non-active ECU n goes above another threshold value.

If at step 540 the controller determines that the abnormality in the voltage supplied to the non-active electric control unit ECU n disappears, the controller controls the phase disconnector 120-n of the non-active ECU n to electrically connect the non-active electric control unit ECU n with the motor control system 1 such as the motor 110 and/or the active ECU 1 by closing (e.g. turning on) the phase disconnector 120-n (e.g. third switches SW3a-n, SW3b-n, SW3c-n) of the non-active ECU n (step 545). At step 545, the active ECU 1 continues to perform operation as the primary or master ECU controlling the motor 110, and both the phase disconnector 120-1 (e.g. third switches SW3a-1, SW3b-1, SW3c-1) of the active ECU 1 and the phase disconnector 120-n (e.g. third switches SW3a-n, SW3b-n, SW3c-n) of the non-active ECU n are closed (i.e. turned on).

And, at step 550, the controller may determine whether an abnormality is detected in a voltage supplied to the active electric control unit ECU 1 by the power source 100-1. The abnormality detected at step 550 may be, for example, but not limited to, a status that a power source such as a battery is shorted or opened, or a case that an uncontrolled current flows from one ECU to another ECU.

If at step 550 the abnormality is detected in the voltage which is supplied to the active ECU 1 by the power source 100-1, the controller may control the phase disconnector 120-1 of the active ECU 1 to electrically disconnect the shorted or opened active ECU 1 from the loop of the motor control system 1 such as the motor 110 and/or other ECUs 2 to N by opening (e.g. turning off) the phase disconnector 120-1 (e.g. third switches SW3a-1, SW3b-1, SW3c-1) of the active ECU 1 (step 555). Alternatively, the phase disconnector 120-1 (e.g. third switches SW3*a*-1, SW3*b*-1, SW3*c*-1) of the active ECU 1 can be automatically opened or turned off when the active ECU 1 experience the abnormality in the power source 100-1.

After the phase disconnector 120-1 (e.g. third switches SW3*a*-1, SW3*b*-1, SW3*c*-1) of the active ECU 1 is opened (or turned off) and the active ECU 1 is completely electrically disconnected from the loop of the motor control system 1, the controller controls one of non-active ECUs 2 to N-1 to be activated so that the mode of the activated ECU is changed from a non-active mode to an active mode and the activated ECU can act as a primary or master ECU controlling the motor 110 (step 560).

Figure 6:
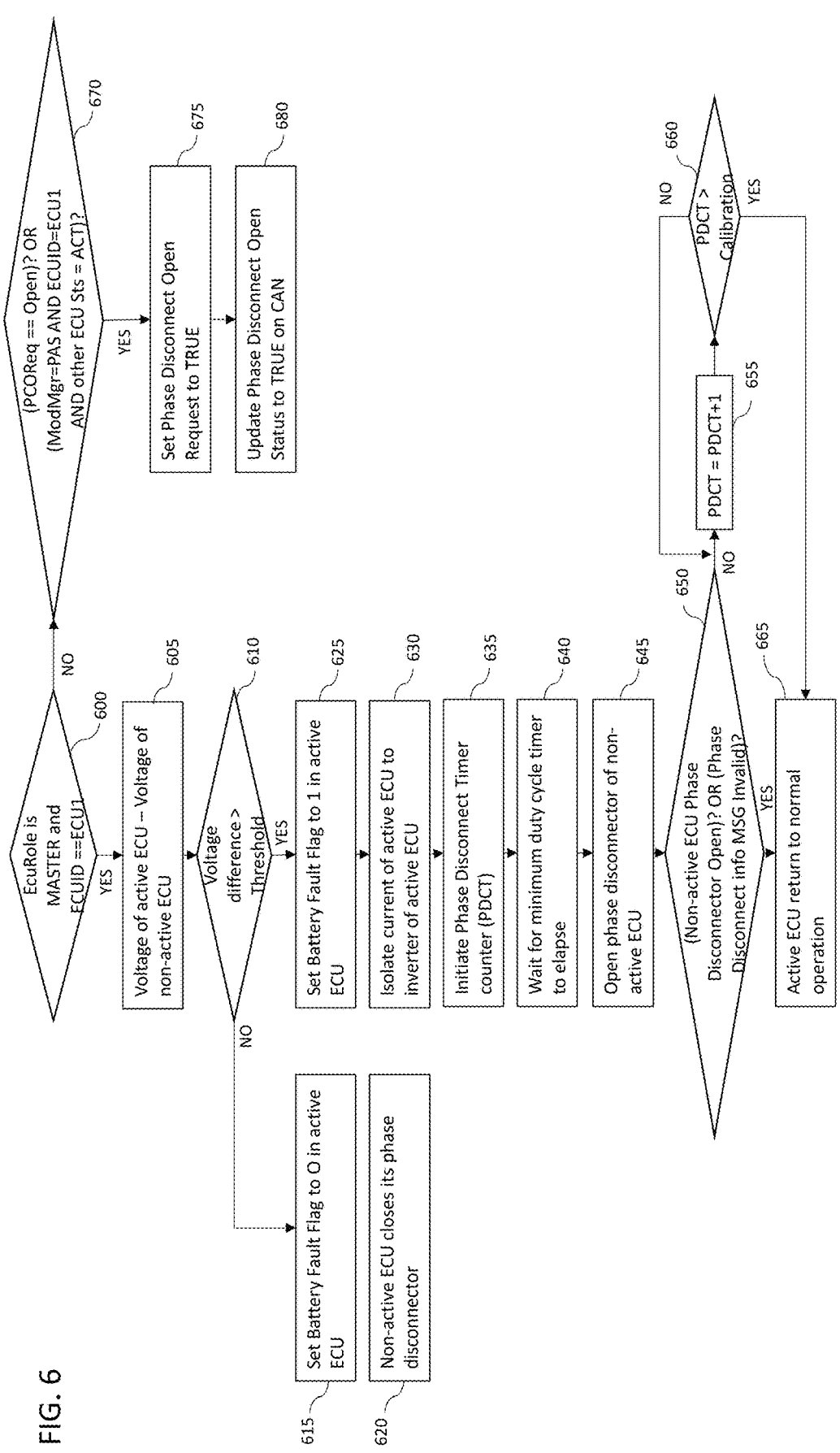
FIG. 6 is a detailed flowchart for a method for controlling a motor control system according to an exemplary embodiment of the present disclosure.

FIG. 6 is a detailed flowchart for a method for controlling a motor control system according to an exemplary embodiment of the present disclosure.

At step 600, a controller of a present ECU of which logic is being checked determines whether the present ECU is ECU 1 (ECUID==ECU1?) and is set as a primary or master ECU (EcuRole is MASTER?) which is in an active state.

If at step 600 it is determined that the present ECU is ECU 1 and operates as an active and master ECU, the controller calculates a voltage difference between the power source 100-1 of the active ECU 1 and the power source **100-*n* of the non-active ECU n (step 605), and monitors whether the voltage difference between the power source 100-1 of the active ECU 1 and the power source 100-*n* of the non-active ECU n is over a threshold value (step 610). The threshold value is a predetermined value and can be preset as a voltage difference between power sources that is capable of causing the current to flow from an active electric control unit to a non-active electric control unit. For example, the threshold value is set to a voltage drop of diodes which are in a path from an inverter of an active electric control unit to a terminal of the non-active electric control unit connected to a power source. In the exemplary embodiment, the threshold value is a voltage drop of diodes which are in a path from the inverter INV 1 of the active ECU 1 to the DC bus 205-*n*** of the non-active ECU n. The threshold value may be between 1.5V and 2.5V, preferably 2V.

If at step 610 it is determined that the voltage difference between the power source 100-1 of the active ECU 1 and the power source **100-*n* of the non-active ECU n is equal to or less than the threshold value, the controller of the present ECU (i.e. the controller 130-1 of the active and master ECU 1) sets a Battery Fault Flag to 0 to indicate that no abnormality is detected in the power source 100-*n* of the non-active ECU n (step 615). Then, the non-active ECU n controls the phase disconnector 120-*n*** (e.g. third switches SW3*a*-*n*, SW3*b*-*n*, SW3*c*-*n*) of the non-active ECU n to be closed (i.e. turned on) (step 620).

If at step 610 it is determined that the voltage difference between the power source 100-1 of the active ECU 1 and the power source **100-*n* of the non-active ECU n is greater than the threshold value, the controller of the present ECU (i.e. the controller 130-1 of the active and master ECU 1) sets the Battery Fault Flag to 1 to indicate that the non-active ECU n experiences the abnormality in its power source 100-*n* such as being short or open circuited (step 625**).

After (or at the same time as) step 625, the controller may make a duty cycle of the active ECU 1 zero to isolate the current of the active ECU 1 to the inverter INV 1 of the active ECU 1, or divert the current from the non-active ECU n (step 630). For example, at step 630, the controller closes (i.e. turns on) the second switches SW2*a*-1, SW2*b*-1, SW2*c*-1 (lower side switches) of INV 1 of the active ECU 1. By the isolation of the current of the active ECU 1 to the inverter INV 1 of the active ECU 1, no current may flow from the active ECU 1 to the non-active ECU n. By isolating the current of the active ECU 1 to the inverter INV 1 of the active ECU 1 before opening the phase disconnector **120-*n*** (e.g. third switches SW3*a*-*n*, SW3*b*-*n*, SW3*c*-*n*) of the non-active ECU n, the high voltage spike caused by the uncontrolled current flowed due to the voltage difference between ECU 1 and ECU n can be prevented because no uncontrolled current is able to flow from the active ECU 1 to the non-active ECU n.

Then, the controller initiates a Phase Disconnect Timer counter (PDCT) (step 635), and waits for a minimum duty cycle timer to elapse (step 640). The minimum duty cycle timer is set to be equal to or longer than necessary or minimum time for the operation of isolating the current of the active ECU 1 to the inverter INV 1 of the active ECU 1, or diverting the current from the non-active ECU n (for example, minimum time for closing or turning on the lower side switches SW2*a*-1, SW2*b*-1, SW2*c*-1 of INV 1 of the active ECU 1). The minimum duty cycle timer may prevent the non-active ECU n from receiving any current from the active ECU 1 before the phase disconnector **120-*n*** (e.g. third switches SW3*a*-*n*, SW3*b*-*n*, SW3*c*-*n*) of the non-active ECU having die abnormality in the power source **100-*n*** is opened (e.g. turned off).

After the minimum duty cycle timer lapses at step 640, the phase disconnector **120-*n*** (e.g. third switches SW3*a*-*n*, SW3*b*-*n*, SW3*c*-*n*) of the non-active ECU n is opened in order to electrically disconnect the non-active ECU from the loop of the motor control system 1 such as the motor 110 and/or the active ECU 1 by turning off the phase disconnector **120-*n*** (e.g. third switches SW3*a*-*n*, SW3*b*-*n*, SW3*c*-*n*) of the non-active ECU n (step 645).

At step 650, the controller of the present ECU (i.e. the controller 130-1 of the active and master ECU 1) checks whether the phase disconnector **120-*n*** (e.g. third switches SW3*a*-*n*, SW3*b*-*n*, SW3*c*-*n*) of the non-active ECU n is opened and whether a message of information regarding a state of the phase disconnector **120-*n*** (e.g. third switches SW3*a*-*n*, SW3*b*-*n*, SW3*c*-*n*) of the non-active ECU n (Phase Disconnect Info Msg) is invalid. The message of the information regarding the phase disconnector is communicated between ECUs through internal controller area network (CAN), and the validity check is performed on the message exchanged between the ECUs. The validity of the message of the information regarding the state of the phase disconnector **120-*n* of die non-active ECU n is checked by the active ECU 1** in order to confirm whether a wrong information exchange occurs due to communication failure.

If the phase disconnector **120-*n*** (e.g. third switches SW3*a*-*n*, SW3*b*-*n*, SW3*c*-*n*) of the non-active ECU n is still closed or if the message of information regarding the state of the phase disconnector **120-*n*** (e.g. third switches SW3*a*-*n*, SW3*b*-*n*, SW3*c*-*n*) of the non-active ECU n is valid, the controller of the present ECU (i.e. the controller 130-1 of the active and master ECU 1) increases the PDCT counter by a predetermined increment (for example, 1 in the exemplary embodiment) (step 655). The PDCT counter continues to be incremented at the predetermined rate. Then, the controller of the present ECU (i.e. the controller 130-1 of the active and master ECU 1) detects whether the PDCT counter is greater than a threshold value in order to determine whether an amount of time which is spent on the operation of the opening of the phase disconnector **120-*n* of the non-active ECU n passes a threshold time (step 660**). The threshold valve may be Phase Disconnect Timer calibration.

The threshold value may be preset to correspond to maximum time allowed to complete the full operation of opening the phase disconnector of the non-active ECU. Steps 655 and 660 can avoid a situation in which either ECU 1 or ECU n gets struck in the attempt for opening the phase disconnector 120-n (e.g. third switches SW3a-n, SW3b-n, SW3c-n) of the non-active ECU n. When the amount of time spent for opening the phase disconnector 120-n (e.g. third switches SW3a-n, SW3b-n, SW3c-n) of the non-active ECU n exceeds predetermined threshold time, the controller of the present ECU (i.e. the controller 130-1 of the active and master ECU 1) may come out of the operation associated with the opening of the phase disconnector 120-n.

If at step 650 it is determined that the phase disconnector 120-n (e.g. third switches SW3a-n, SW3b-n, SW3c-n) of the non-active ECU n is opened or that the message of information regarding the state of the phase disconnector 120-n (e.g. third switches SW3a-n, SW3b-n, SW3c-n) of the non-active ECU n is invalid, or if at step 660 it is determined that the PDCT counter exceeds the threshold value, the controller controls the active ECU 1 to resume a normal operation and control the motor 110 (step 665). Additionally, at step 665, the active ECU 1 may reset proportional integral (PI) control calculation to zero. During the time when the current of the active ECU 1 is isolated to the inverter INV 1 of the active ECU 1 to divert the current from the non-active ECU n, the active ECU keeps performing the PI control calculation which is invalid for that time period, and therefore the PI control calculation needs to be reset after the isolation state of the current of the active ECU 1 to the inverter INV 1 of the active ECU 1 is released.

And, at step 670, if it is determined at step 600 that the present ECU of which logic is being checked is not a master ECU or the present ECU is not ECU 1, the controller of the present ECU determines whether the phase disconnector of the present ECU has been requested to be opened (PCOReq==Open?, wherein PCOReq is a Phase Cut Off Request), and whether the mode manager state of the present ECU is a passive state (ModMgr=PAS?), the present ECU is ECU 1 (ECUID=ECU1?), and any one of other ECUs 2 to N is in an active state (other ECU sts=ACT?).

If at step 670 it is determined that the phase disconnector of the present ECU has been requested to be opened, or if at step 670 it is determined that the mode manager state of the present ECU is a passive state, the present ECU is ECU 1 and any one of other ECUs 2 to N is in an active state, the controller of the present ECU sets its phase disconnect open request to TRUE (step 675). At step 675, the phase disconnector of the present ECU is commended to be opened.

And, the controller of the present ECU updates a phase disconnect open status to TRUE on a controller area network (CAN) (step 680). The phase disconnect open status is set to TRUE if the request to open a phase disconnector has been made.

According to the exemplary embodiments of FIGS. 5 and 6, when the non-active ECU has abnormality in its power source (e.g., being short or open circuited), the current of the active ECU is isolated to its inverter first to be diverted from the non-active ECU before the phase disconnector of the non-active ECU is opened, and therefore because no uncontrolled current is able to flow from the active ECU to the non-active ECU, the high voltage spike caused by the uncontrolled current flowed due to the voltage difference between the active ECU and the shorted or opened non-active ECU can be prevented, and the shorted or opened non-active ECU can be securely removed from the loop of the motor control system.

Figure 7A:
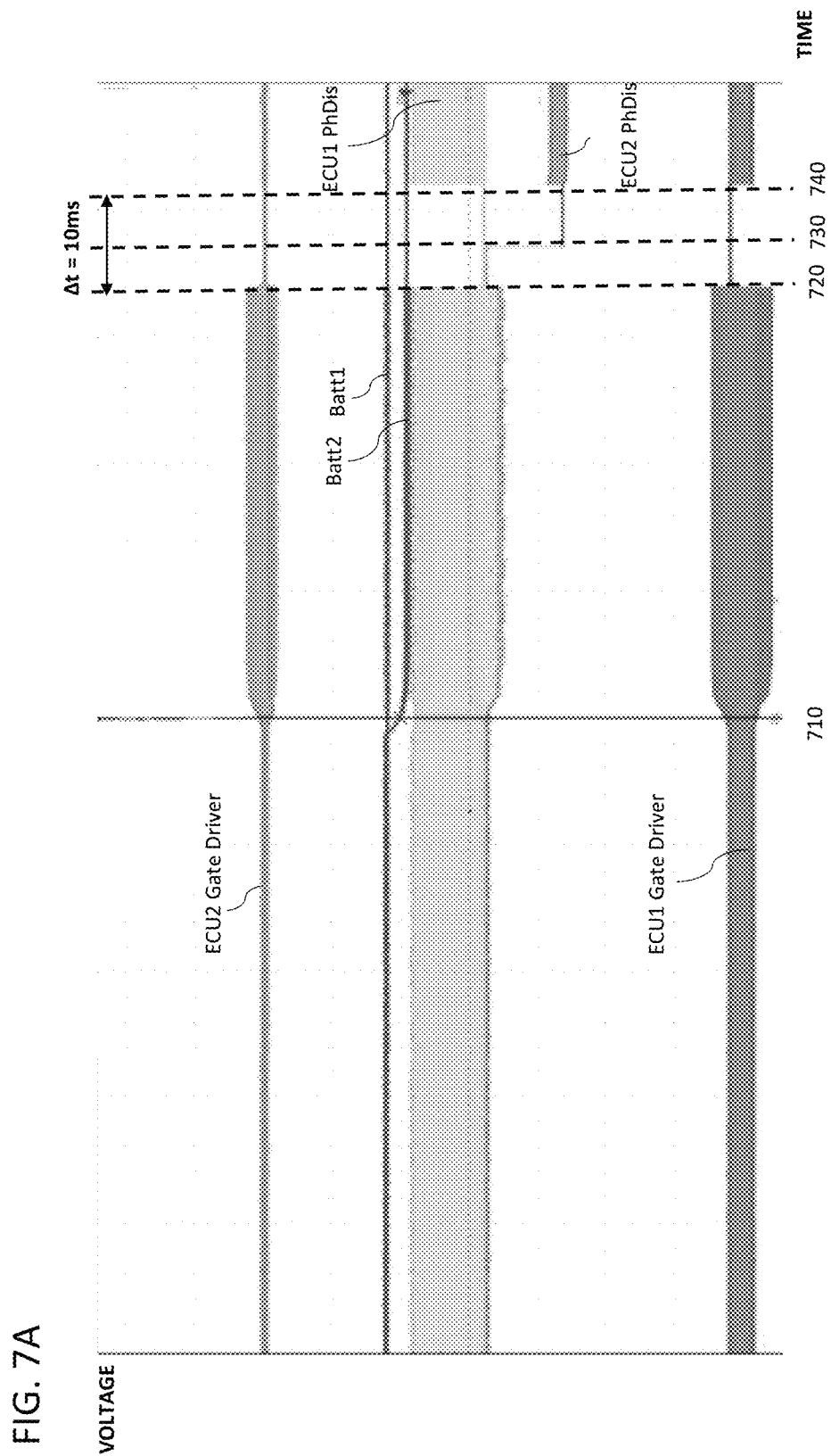
FIGS. 7A, 7B and 7D show exemplary time traces of voltages of power sources, phase disconnectors, gate drivers of ECUs
Figure 7B:
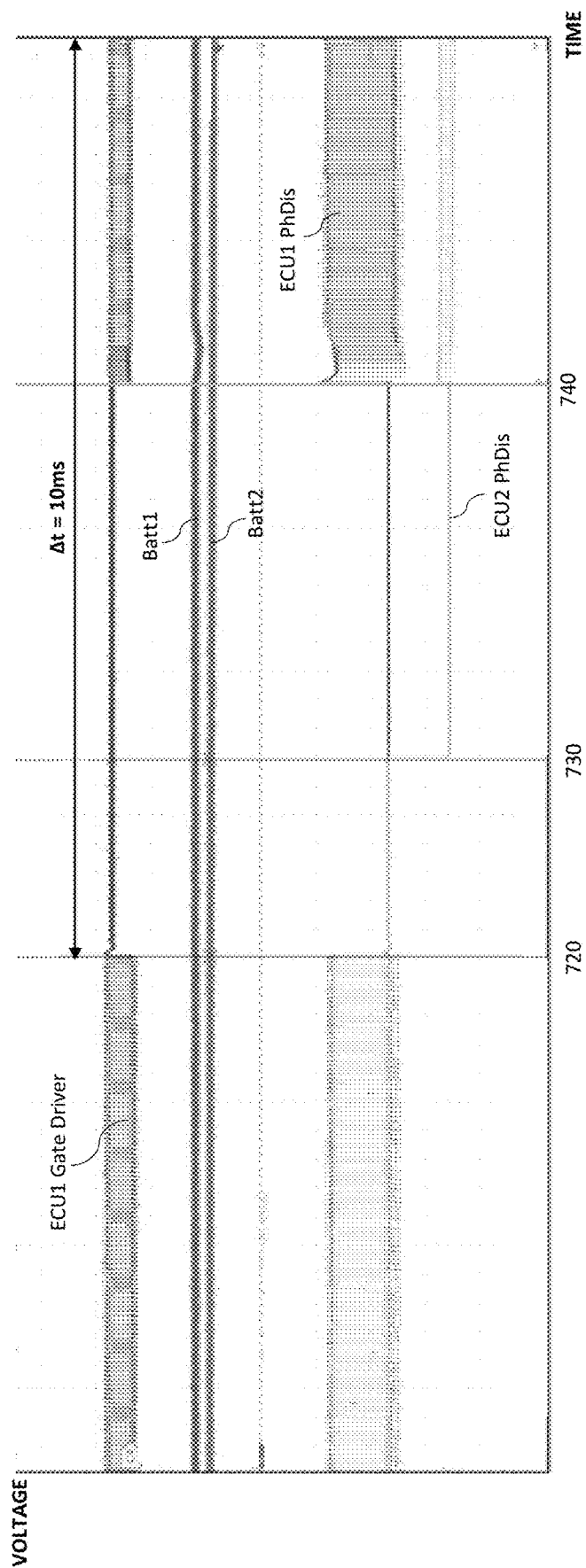
Figure 7C:
FIG. 7C illustrates a time trace of a motor torque according to an embodiment of the present disclosure in a case that ECU 1 is an active ECU and a non-active ECU becomes short-circuited.
Figure 7D:
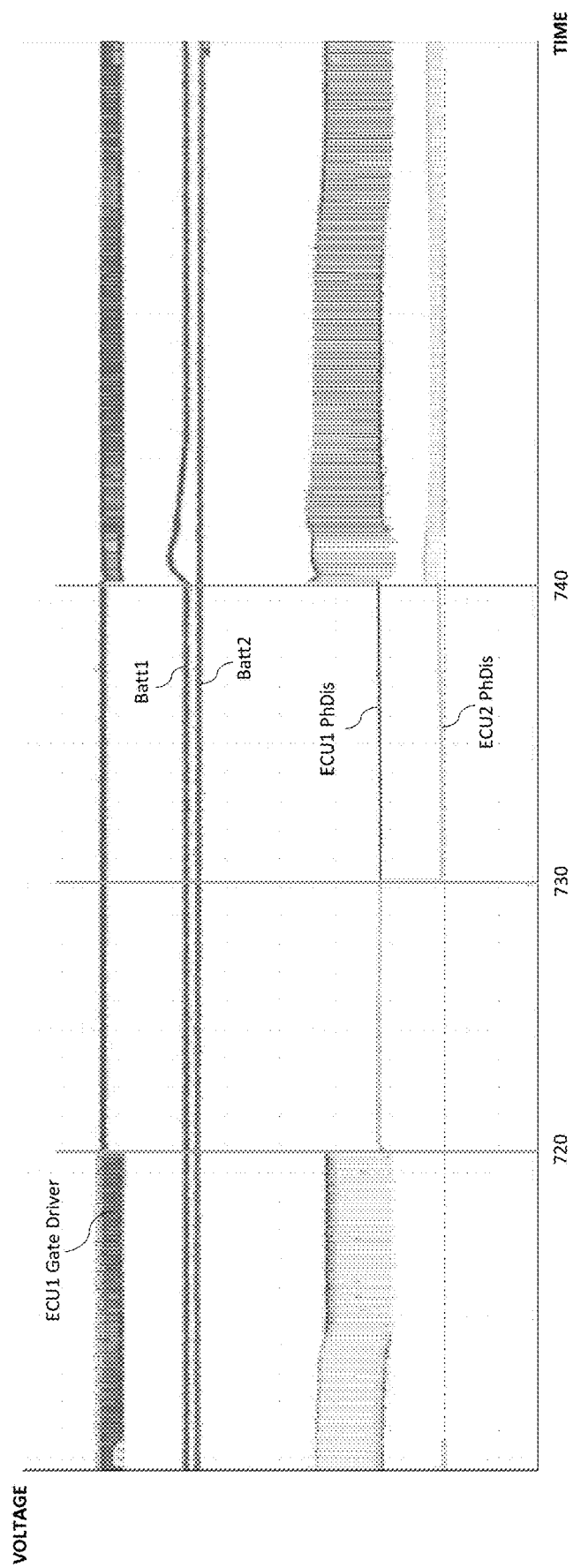

FIGS. 7A, 7B and 7D show exemplary time traces of voltages of power sources, phase disconnectors, gate drivers of ECUs and FIG. 7C illustrates a time trace of a motor torque according to an embodiment of the present disclosure in a case that ECU 1 is an active ECU and a non-active ECU becomes short-circuited. In the exemplary embodiments, ECU 1 acts as a master ECU controlling the motor 110 under normal conditions and is in an active state, and ECU 2 is a back-up ECU and is in a non-active state. FIGS. 7A to 7C illustrate an exemplary embodiment in which ECU 1 is operating at 1 Nm at 40 RPM while FIG. 7D shows an exemplary embodiment in which ECU 1 is operating at 0 Nm at 1500 RPM. Unlike the exemplary embodiment of FIGS. 7A to 7C, in the exemplary embodiment of FIG. 7D, the voltage generated by the dominant back electromotive force can affect the uncontrolled current flow from ECU 1 to ECU 2 in addition to the voltages of the power sources 100-1 and 100-2 of ECU 1 and ECU 2 because of the high RPM rotation of the motor 110 with no active torque command.

Before time 710, the voltage of the power source 100-1 of the ECU 1 (Batt1) and the voltage of the power source 100-2 of the ECU 2 (Batt2) are identical to each other, and the phase disconnector 120-1 of the ECU 1 (ECU1 PhDis) and the phase disconnector 120-2 of the ECU 2 (ECU2 PhDis) are closed and are operating normally. The non-active ECU 2 is electrically connected to the motor 110 and ECU 1, but the duty cycle of the inverter gate driver 230-2 of ECU 2 (ECU2 Gate Driver) is zero.

Around time 710, the power source 100-2 of the non-active ECU 2 is short-circuited, and between time 710 and time 720, the voltage difference between the power source 100-1 of the active ECU 1 (Batt1) and the power source 100-2 of the non-active ECU 2 (Batt2) by greater than a threshold value due to the short of the power source 100-2 of the ECU 2 is detected.

At time 720, the second switches SW2a-1, SW2b-1, SW2c-1 (lower side switches) of INV 1 of the active ECU 1 are turned on (i.e. closed) to divert the current from the non-active ECU 2 and isolate the current of the active ECU 1 to the inverter INV 1 of the active ECU 1. The inverter gate driver 230-1 of ECU 1 (ECU1 Gate Driver) may make a duty cycle of the active ECU 1 zero.

After the second switches SW2a-1, SW2b-1, SW2c-1 (lower side switches) of INV 1 of the active ECU 1 are turned on, the phase disconnector 120-2 of the shorted ECU 2 (ECU2 PhDis) electrically disconnects the shorted ECU 2 from the loop of the motor control system 1 such as the motor 110 and/or the active ECU 1 (time 730). For example, the third switches SW3a-2, SW3b-2, SW3c-2 of the shorted ECU 2 of FIG. 2 are opened (e.g. turned off).

Then, after time 740, the inverter gate driver 230-1 of the ECU returns to a normal operation so that the ECU 1 can control the motor 110 as a master ECU under normal conditions.

As shown in FIGS. 7A to 7B, the active ECU 1 can resume its normal operation after safely removing the short-circuited ECU 2 within around 10 ms, and as illustrated in FIG. 7C, the torque of the motor 110 returns to a normal level within around 10 ms.

Figure 7E:
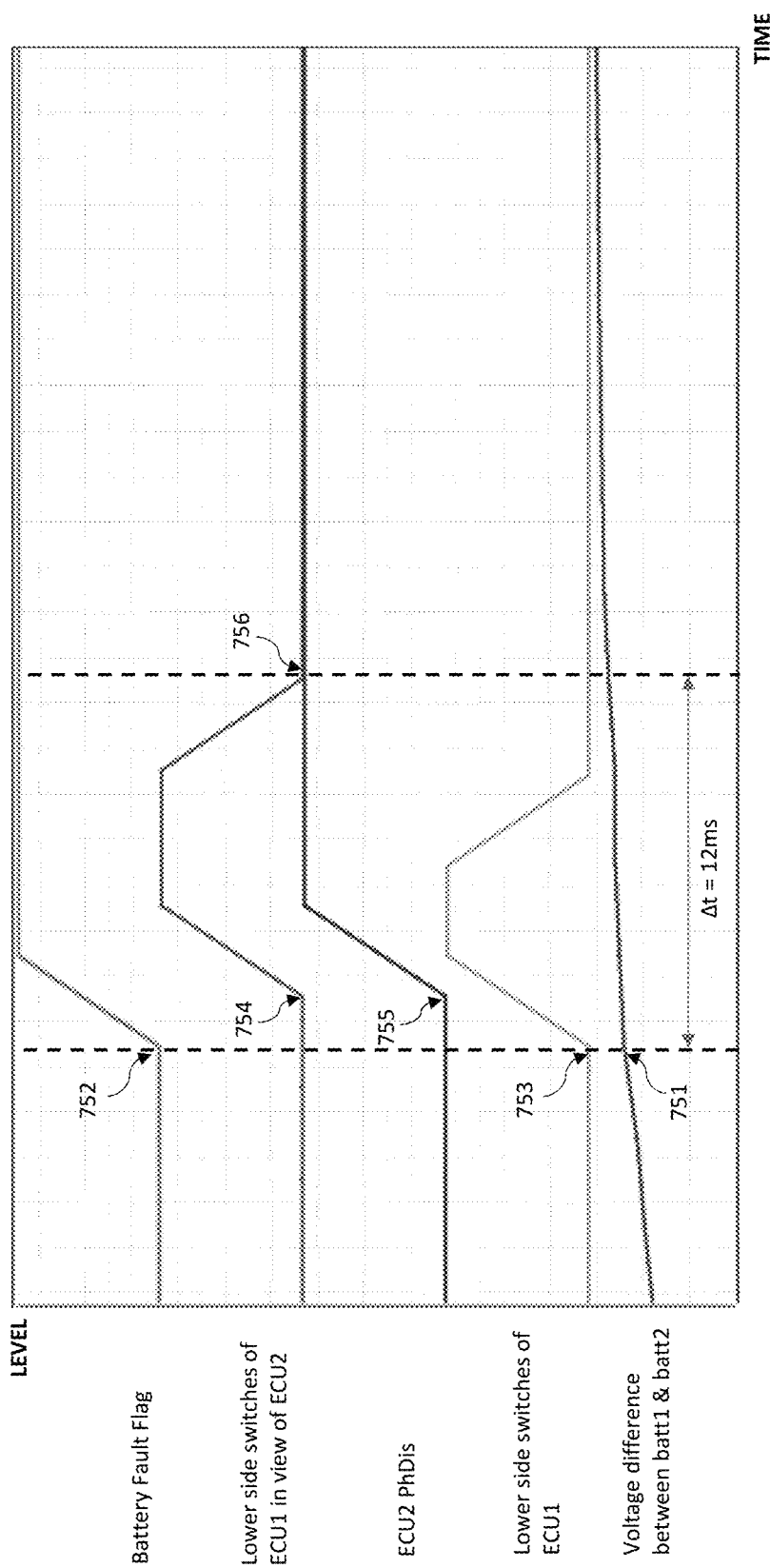
FIG. 7E illustrates exemplary CANape traces of Battery Fault Flag, lower side switches of ECU 1 in view of ECU 2, ECU2 PhDis, lower side switches of ECU1, and voltage difference between batt1 and batt2 according to an embodiment of the present disclosure in a case that ECU 1 is an active ECU and a non-active ECU 2 becomes short-circuited.

FIG. 7E illustrates exemplary CANape traces of Battery Fault Flag, lower side switches of ECU 1 in view of ECU 2, ECU2 PhDis, lower side switches of ECU1, and voltage difference between batt1 and batt2 according to an embodiment of the present disclosure in a case that ECU 1 is an active ECU and a non-active ECU 2 becomes short-circuited.

At time 751, the controller 131-1 of the active ECU 1 detects that the voltage difference between the power source 100-1 of the active ECU 1 and the power source 100-2 of the non-active ECU 2 is greater than a threshold value. This may mean that the short of the power source 100-2 of the non-active ECU 2 is detected by the controller 131-1 of the active ECU 1.

In response to the detection that the voltage difference between the power source 100-1 of the active ECU 1 and the power source 100-2 of the non-active ECU 2 becomes over the threshold value, the controller 131-1 of the active ECU 1 sets the Battery Fault Flag to "1" to indicate that the power source 100-2 of the non-active ECU 2 has abnormality (e.g. short) (time 752). Immediately after the Battery Fault Flag is set to "1", the controller 131-1 of the active ECU 1 controls the second switches SW2a-1, SW2b-1, SW2c-1 (lower side switches) of INV 1 of the active ECU 1 to be closed (i.e. turned on) in order to isolate current of the active ECU 1 to the inverter INV 1 of the active ECU 1 and/or divert the current from the non-active ECU 2 (time 753).

At time 754, the controller 131-2 of the non-active ECU 2 detects that the second switches SW2a-1, SW2b-1, SW2c-1 (lower side switches) of INV 1 of the active ECU 1 have been closed (i.e. turned on). At time 755, after a first predetermined time elapses from the closing of the second switches SW2a-1, SW2b-1, SW2c-1 (lower side switches) of INV 1 of the active ECU 1, the controller 131-2 of the non-active ECU 2 controls the phase disconnector 120-2 of the non-active ECU 2 to electrically disconnect the shorted non-active ECU 2 from the loop of the motor control system 1 such as the motor 110 and/or the active ECU 1 by opening (e.g. turning off) the phase disconnector 120-2 (e.g. third switches SW3a-2, SW3b-2, SW3c-2) of the non-active ECU 2 (time 755).

At time 756, after a second predetermined time elapses from the opening of the phase disconnector 120-2 (e.g. third switches SW3a-2, SW3b-2, SW3c-2) of the non-active ECU 2 or when the controller 131-1 of the active ECU 1 detects that the phase disconnector 120-2 (e.g. third switches SW3a-2, SW3b-2, SW3c-2) of the non-active ECU 2 is opened (e.g., turned off), the inverter gate driver 230-1 of the active ECU 1 returns to a normal operation so that the active ECU 1 can control the motor 110 under normal conditions.

Figure 7F:
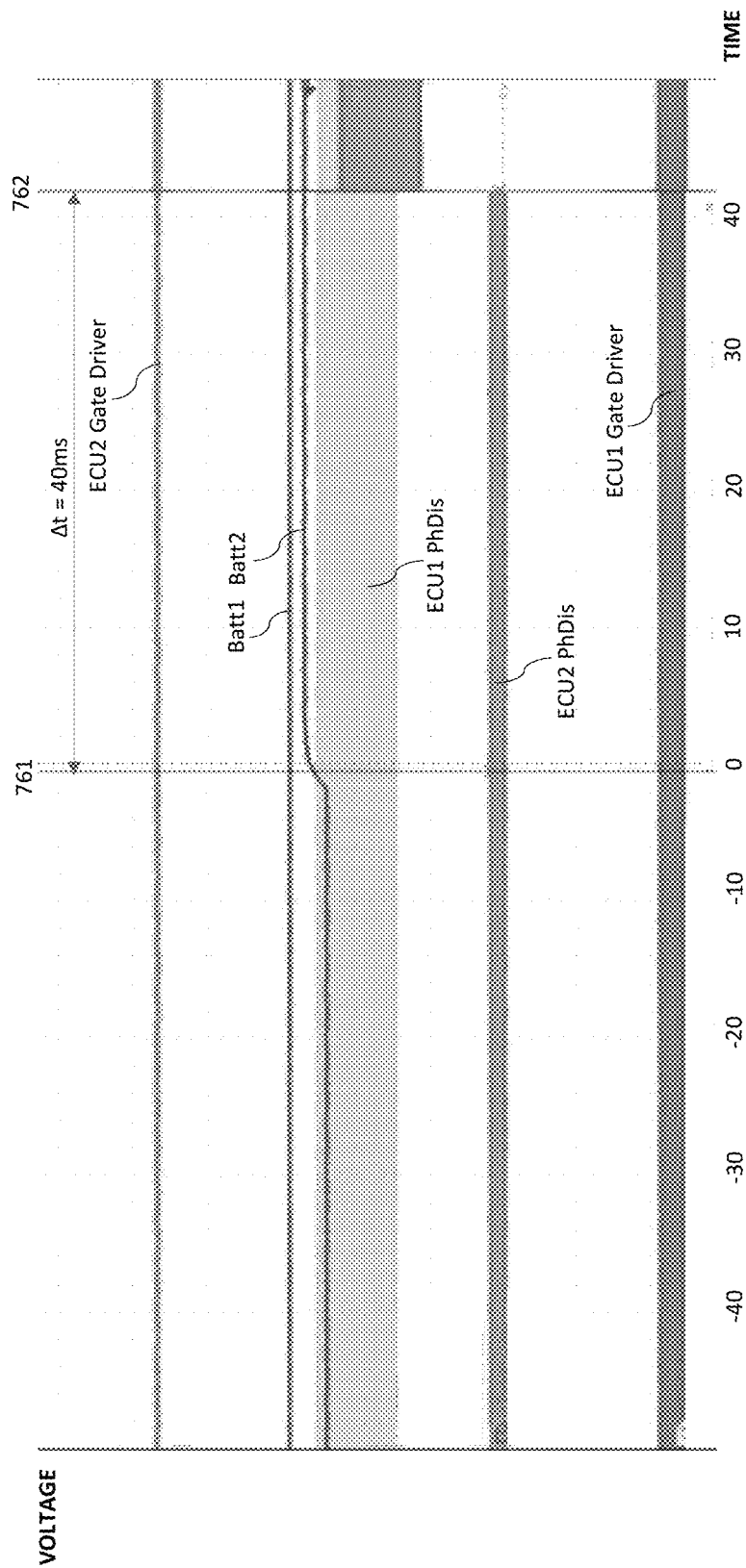
FIG. 7F illustrates exemplary time traces of voltages of power sources, phase disconnectors, and inverter gate drivers of ECUs according to an embodiment of the present disclosure in a case that ECU 1 is an active ECU and a non-active ECU 2 has been electrically disconnected due to its abnormality and then becomes recovered from the abnormality.

FIG. 7F illustrates exemplary time traces of voltages of power sources, phase disconnectors, and inverter gate drivers of ECUs according to an embodiment of the present disclosure in a case that ECU 1 is an active ECU and a non-active ECU 2 has been electrically disconnected due to its abnormality and then becomes recovered from the abnormality.

Before time 761, ECU 1 is an active and master ECU and the phase disconnector 120-1 (e.g. third switches SW3a-1, SW3b-1, SW3c-1) of the ECU 1 (ECU PhDis) is closed (e.g. turned on). The inverter gate driver 230-1 of the active ECU 1 (ECU1 Gate Driver) controls the first inverter INV 1 by the PWM duty-cycle commands in order to regulate the phase voltages of the motor 110. However, ECU 2 has been electrically disconnected from the loop of the motor control system 1 due to die short of the power source 100-2 of the non-active ECU 2 by opening (e.g. turning off) the phase disconnector 120-2 (e.g. third switches SW3a-2, SW3b-2, SW3c-2) of the non-active ECU 2 (ECU2 PhDis).

At time 761, the difference between the voltage of the power source 100-1 of the active ECU 1 (Batt1) and the voltage of the power source 100-2 of the non-active ECU 2 (Batt2) becomes below the threshold value. This may mean that a voltage supplied to the ECU 2 returns to a normal operation level or that no uncontrolled current would flow from the active ECU 1 to the non-active ECU 2.

Then, at time 762, the phase disconnector 120-2 (e.g. third switches SW3a-2, SW3b-2, SW3c-2) of the non-active ECU 2 (ECU2 PhDis) is closed (e.g. turned on) to electrically connect the recovered ECU 2 to the loop of the motor control system 1 such as the motor 110 and/or the active ECU 1. Even after the phase disconnector 120-2 of the non-active ECU 2 is closed and the non-active ECU 2 is reconnected to the loop of the motor control system 1, the active ECU 1 remain as the master or primary ECU and continues to perform normal operations of controlling the motor 110, and the duty cycle of the inverter gate driver 230-2 of the non-active ECU 2 (ECU2 Gate Driver) is zero.

As shown in FIG. 7F, the non-active ECU 2 disconnected from the loop of the motor control system 1 can be recovered within 10 ms after the abnormality in the power source 100-2 of the non-active ECU 2 disappears.

FIG. 7G illustrates exemplary CANape traces of Battery Fault Flag, ECU2 PhDis, and voltage difference between batt1 and batt2 according to an embodiment of the present disclosure in a case that ECU 1 is an active ECU and a non-active ECU 2 has been electrically disconnected due to its abnormality and then becomes recovered from the abnormality.

Before time 765, ECU 2 has been electrically disconnected from the loop of the motor control system 1 such as the motor 110 and/or the active ECU 1 by opening (e.g., turning off) the phase disconnector 120-2 (e.g. third switches SW3a-2, SW3b-2, SW3c-2) of the non-active ECU 2 (ECU2 PhDis) due to the short of the power source 100-2 of the non-active ECU 2.

At time 765, the difference between the voltage of the power source 100-1 of the active ECU 1 (Batt1) and the voltage of the power source 100-2 of the non-active ECU 2 (Batt2) becomes below the threshold value. This may mean that a voltage supplied to the ECU 2 returns to a normal operation level or that no uncontrolled current would flow from the active ECU 1 to the non-active ECU 2.

Then, at time 766, the Battery Fault Flag is changed from "1" to "0" to indicate that no abnormality is detected in the power source 100-2 of the non-active ECU 2.

After that, at time 767, the phase disconnector 120-2 (e.g. third switches SW3a-2, SW3b-2, SW3c-2) of the non-active ECU 2 (ECU2 PhDis) is closed (e.g. turned on) so that the recovered non-active ECU 2 can be electrically reconnected to the loop of the motor control system 1. Even after the phase disconnector 120-2 of the non-active ECU 2 is closed and the ECU 2 is reconnected to the loop of the motor control system 1, the active ECU 1 remain as the master or primary ECU and continues to perform normal operations of controlling the motor 110.

As shown in FIG. 7G, the non-active ECU 2 disconnected from the loop of the motor control system 1 can be recovered within 10 ms after the abnormality in the power source 100-2 of the non-active ECU 2 disappears.

Figure 7H:
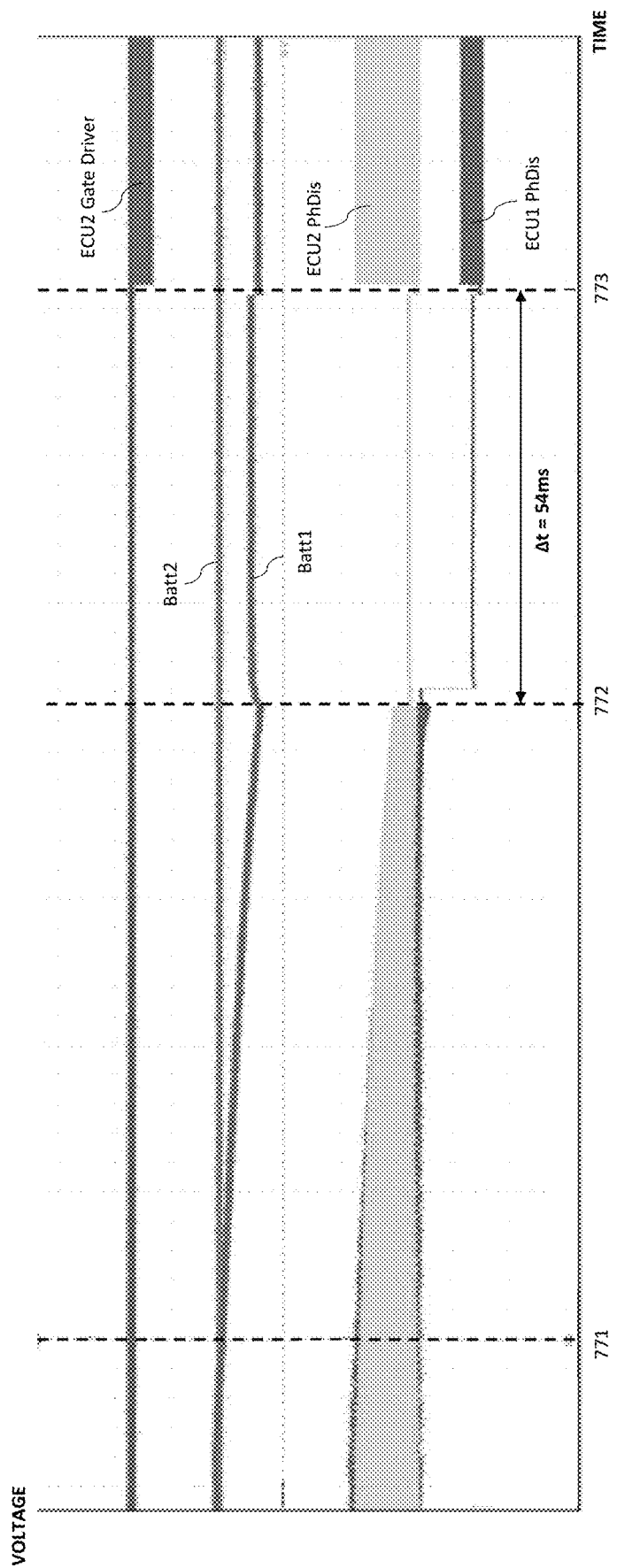
Figure 71:
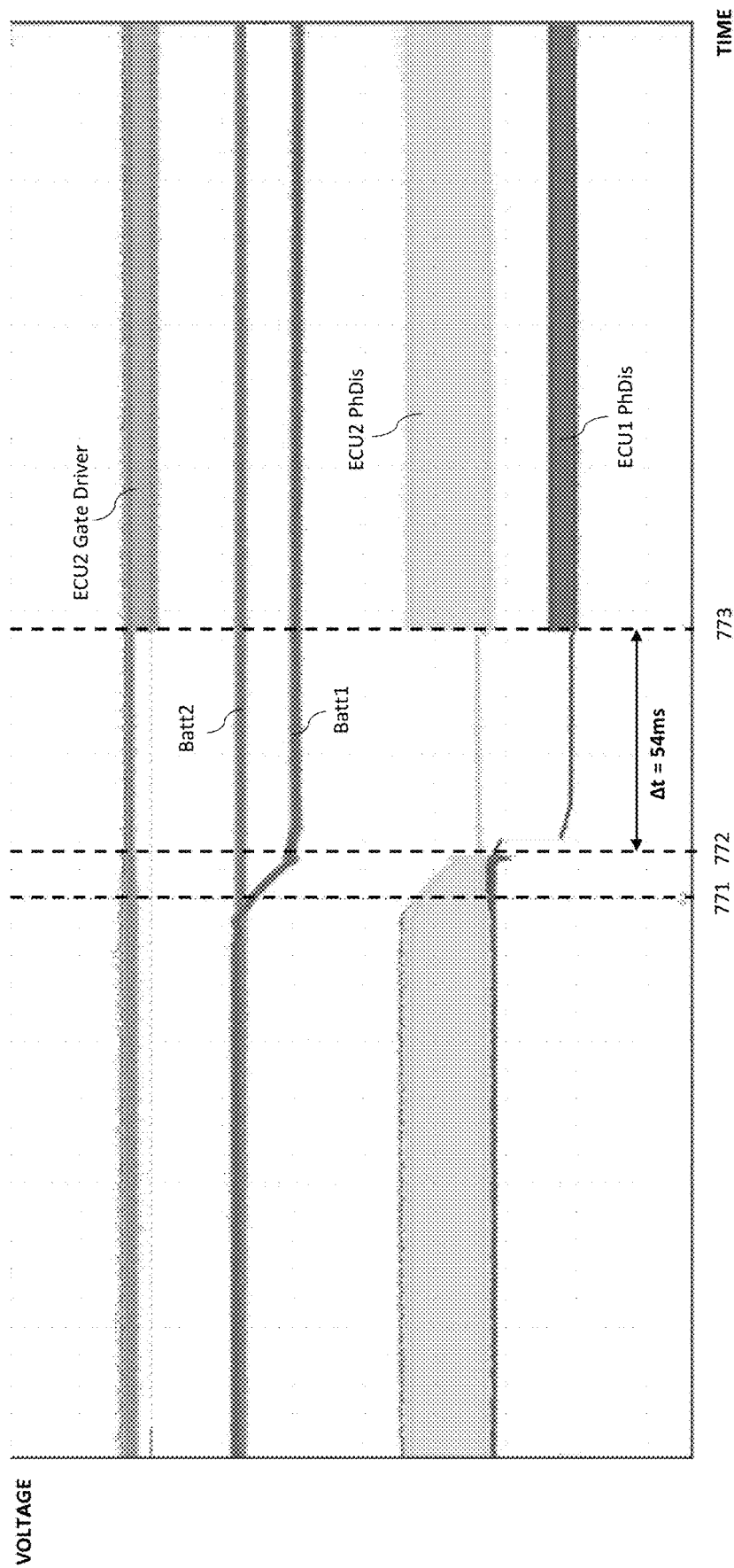
Figure 7J:
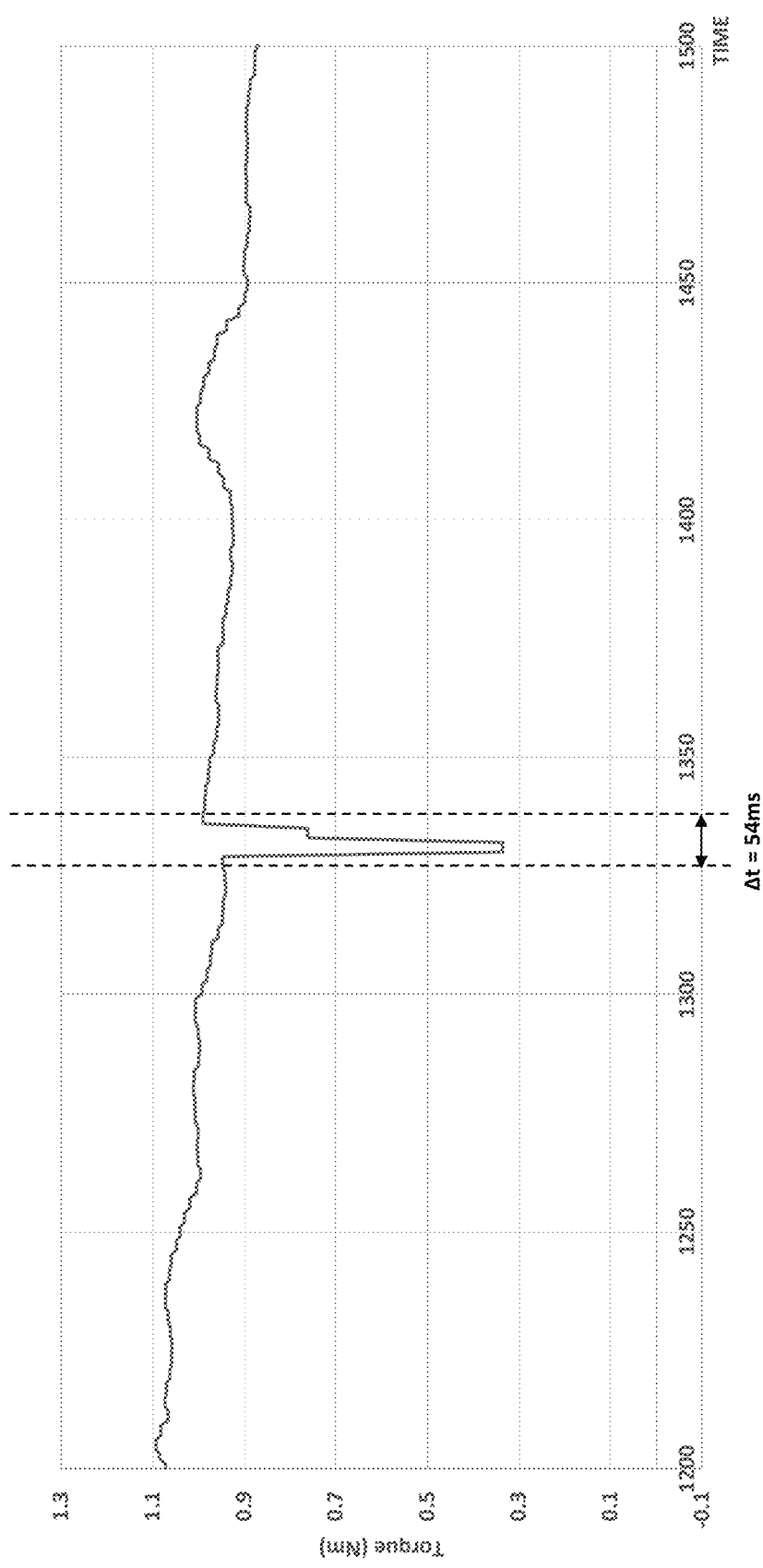
FIG. 7J illustrates a time trace of a motor torque according to an embodiment of the present disclosure in a case that an active ECU becomes short-circuited.

FIGS. 7H and 7I show exemplary time traces of voltages of power sources, phase disconnectors, an inverter gate driver of ECUs, and FIG. 7J illustrates a time trace of a motor torque according to an embodiment of the present disclosure in a case that an active ECU becomes short-circuited. FIGS. 7I and 7J illustrate an exemplary embodiment in which ECU 1 is operating at 1 Nm at 40 RPM.

Before time 771, ECU 1 acts as a master ECU controlling the motor 110 under normal conditions and is in an active state, and ECU 2 is set as a back-up ECU and is in a non-active state. And, both the phase disconnector 120-1

(e.g. third switches SW3a-1, SW3b-1, SW3c-1) of the active ECU 1 (ECU1 PhDis) and the phase disconnector 120-2 (e.g. third switches SW3a-2, SW3b-2, SW3c-2) of the non-active ECU 2 (ECU2 PhDis) are closed (e.g. turned on). The voltage of the power source 100-1 of the active ECU 1 (Batt1) and the voltage of the power source 100-2 of the non-active ECU 2 (Batt2) are substantially identical to each other.

After time 771, the voltage of the power source 100-1 of the active ECU 1 (Batt1) starts to gradually decrease, and at time 772, the voltage of the power source 100-1 of the active ECU 1 (Batt1) goes below a threshold value or the difference between the voltage of the power source 100-1 of the active ECU 1 (Batt1) and the voltage of the power source 100-2 of the non-active ECU 2 (Batt2) becomes lower than another threshold value.

Then, at time 773, the phase disconnector 120-1 (e.g. third switches SW3a-1, SW3b-1, SW3c-1) of the active ECU 1 electrically disconnects the active ECU 1 from the loop of the motor control system 1 such as the motor 110 and/or ECU 2 by opening (e.g. turning off) the phase disconnector 120-1 (e.g. third switches SW3a-1, SW3b-1, SW3c-1) of the ECU 1. However, the phase disconnector 120-2 (e.g. third switches SW3a-2, SW3b-2, SW3c-2) of ECU 2 remains to be closed (e.g. turned on). After the phase disconnector 120-1 of the active ECU 1 is opened (e.g. turned off), the non-active ECU 2 is set as a master or primary ECU, is activated to take over the control of the motor 110 from ECU 1, and initiates to control the motor 110. From time 773, the inverter gate driver 230-2 of the back-up ECU 2 (ECU2 Gate Driver) controls the second inverter INV 2 by the PWM duty-cycle commands in order to regulate the phase voltages of the motor 110.

As shown in FIGS. 7H to 7J, ECU 2 can safely complete to change a mode from a back-up ECU mode to a master ECU mode to take over the control of the motor 110 from ECU 1 within around 54 ms when ECU 1 experiences the abnormalities in its power source.

FIG. 7K illustrates exemplary CANape traces of voltages of batteries of ECUs 1 and 2, a mode state of ECU2, and ECU1 PhDis according to an embodiment of the present disclosure in a case that an active ECU becomes short-circuited. Unlike the exemplary embodiment of FIGS. 7H to 7J in which the active ECU 1 is operating at 1 Nm at 40 RPM, the active ECU 1 of the exemplary embodiment of FIG. 7K is operating at 0 Nm at 1500 RPM, and the voltage generated by the dominant back electromotive force in the exemplary embodiment of FIG. 7K can affect the uncontrolled current flow in addition to the voltages of the power sources 250-1 and 250-2 of ECU 1 and ECU 2 because of high RPM rotation of the motor 110 with no active torque command.

Before time 781, ECU 1 acts as a master ECU controlling the motor 110 under normal conditions and is in an active state, and ECU 2 is set as a back-up ECU and is in a non-active state. After time 781, the voltage of the power source 100-1 of the active ECU 1 (Batt1) starts to gradually decrease, and then eventually ECU 1 loses power for XCP communication. And, if ECU 1 loses the power, the phase disconnector 120-1 (e.g. third switches SW3a-1, SW3b-1, SW3c-1) of the ECU 1 is automatically opened (e.g. turned off), and therefore ECU 1 is electrically disconnected from the loop of the motor control system 1 such as the motor 110 and/or ECU 2.

At time 782, the non-active ECU 2 detects the failure of the communication of ECU 1 because of a power down of ECU 1 and the opening of the phase disconnector 120-1 (ECU1 PhDis, e.g. third switches SW3a-1, SW3b-1, SW3c-1) of the active ECU 1.

After the phase disconnector 120-1 (third switches SW3a-1, SW3b-1, SW3c-1) of the primary and active ECU 1 is opened (e.g. turned off), at time 783 the back-up and non-active ECU 2 is set as a master or primary ECU, is activated to take over the control of the motor 110 from ECU 1, and initiates to control the motor 110.

As shown in FIG. 7K, ECU 2 can safely complete to change a mode from a back-up ECU mode to a master ECU mode to take over the control of the motor 110 from ECU 1 within around 46 ms when ECU 1 experiences the abnormalities in its power source. If ECU 1 is still communicating after the power source of the power source 100-1 of ECU 1 has abnormality, the phase disconnector 120-1 (third switches SW3a-1, SW3b-1, SW3c-1) of ECU 1 is commended to be opened when the controller 130-1 of ECU 1 detects that the mode state of ECU 1 has been changed from an active state to any other state.

Although some descriptions of the operations of FIGS. 5 to 7K are explained using one exemplary circuit shown in FIG. 2, the circuit diagram of FIG. 2 is merely one example of how the operations of FIGS. 5 to 7K could be implemented in one exemplary circuit. It should be appreciated that embodiments of the present disclosure should not be limited to the circuit illustrated in FIG. 2. One having ordinary skill in the art would understand that the operations of FIGS. 5 to 7K can be implemented in any circuit that is capable of performing operations and functions described above. For example, one having ordinary skill in the art would understand that the kinds, connection and arrangement of components, the types of switches, and the number of switches in the circuit of FIG. 2 can be changed, substituted or altered if the changed, substituted or altered circuit is able to perform some or all operations and functions described above with respect to the exemplary embodiments of FIGS. 5 to 7.

Although the example embodiments have been described in detail, it should be understood that various changes, substitutions and alterations can be made herein without departing from the spirit and scope of the application as defined by the appended claims.

In the present disclosure, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements. The term "connected" or "coupled" may mean direct or indirect connection unless otherwise specified.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A motor control system, comprising:
a motor comprising a plurality of motor windings;
a plurality of power sources;
a plurality of electric control units electrically connected with the motor to control the motor, each of the electric control units comprising an inverter electrically connected with a respective power source, wherein the plurality of electric control units comprise active and non-active electric control units; and
one or more controllers configured to:
monitor whether an abnormality is detected in a voltage supplied to the non-active electric control unit;
response to a detection that the abnormality is detected in the voltage supplied to the non-active electric control unit, isolate current of the active electric control unit to an inverter of the active electric control unit; and
after the current of the active electric control unit is isolated to the inverter of the active electric control unit, electrically disconnect the non-active electric control unit from the active electric control unit and/or the motor.

2. The motor control system of claim 1, wherein the one or more controllers are further configured to, after the non-active electric control unit is electrically disconnected from the active electric control unit and/or the motor, release the active electric control unit from the isolation of the current of the active electric control unit to the inverter of the active electric control unit so that the active electric control unit controls the motor.

3. The motor control system of claim 1, wherein the one or more controllers are configured to:
monitor a difference between a voltage supplied to the active electric control unit and the voltage supplied to the non-active electric control unit; and
determine that, if the difference between the voltage supplied to the active electric control unit and the voltage supplied to the non-active electric control unit is greater than a predetermined threshold, the abnormality is detected in the voltage supplied to the non-active electric control unit.

4. The motor control system of claim 1, wherein the one or more controllers are configured to determine that, if the voltage supplied to the non-active electric control unit is less than a predetermined threshold, the abnormality is detected in the voltage supplied to the non-active electric control unit.

5. The motor control system of claim 1, wherein:
each of the electric control units comprises a phase disconnector connected between the motor and the inverter of each of the electric control units,
the one or more controllers are configured to, after the current of the active electric control unit is isolated to the inverter of the active electric control unit, open the phase disconnector of the non-active electric control unit to electrically disconnect the non-active electric control unit from the active electric control unit and/or the motor.

6. The motor control system of claim 5, wherein the one or more controllers are configured to, in response to a determination that the detected abnormality in the voltage supplied to the non-active electric control unit is removed, close the phase disconnector of the non-active electric control unit to electrically connect the inverter of the non-active electric control unit to the active electric control unit and/or the motor.

7. The motor control system of claim 1, wherein the one or more controllers are configured to, in response to the detection that the abnormality is detected in the voltage supplied to the non-active electric control unit, make a duty cycle of the active electric control unit zero to isolate the current of the active electric control unit to the inverter of the active electric control unit.

8. The motor control system of claim 1, wherein:
each of the electric control units comprises first switches and second switches, wherein a respective one of the first switches and a respective one of the second switches are paired with each other, and a respective one of the motor windings is connected to between a respective one of the first switches and a respective one of the second switches, and
the one or more controllers are configured to, in response to the detection that the abnormality is detected in the voltage supplied to the non-active electric control unit, close the second switches of the active electric control unit to isolate the current of the active electric control unit to the inverter of the active electric control unit.

9. The motor control system of claim 1, wherein the one or more controllers are further configured to, in response to a determination that the detected abnormality in the voltage supplied to the non-active electric control unit is removed, restore electric connection of the non-active electric control unit to the active electric control unit and/or the motor.

10. A motor control system, comprising:
a motor comprising a plurality of motor windings;
a plurality of power sources;
a plurality of electric control units electrically connected with the motor to control the motor, each of the electric control units comprising an inverter electrically connected with a respective power source, wherein the plurality of electric control units comprise active and non-active electric control units; and
one or more controllers configured to:
monitor whether an abnormality is detected in a voltage supplied to the active electric control unit;
in response to a detection that the abnormality is detected in the voltage supplied to the active electric control unit, electrically disconnect the active electric control unit from the non-active electric control unit and/or the motor; and
after the active electric control unit having the abnormality is electrically disconnected from the non-active electric control unit and/or the motor, activate the non-active electric control unit so that the activated non-active electric control unit controls the motor.

11. The motor control system of claim 10, wherein:
each of the electric control units comprises a phase disconnector connected between the motor and the inverter of each of the electric control units, and
the controller is configured to, in response to the detection that the abnormality is detected in the voltage supplied to the active electric control unit, open the phase disconnector of the active electric control unit to electrically disconnect the inverter of the active electric control unit from the non-active electric control unit and/or the motor.

12. The motor control system of claim 10, wherein the one or more controllers are configured to:
monitor a difference between a voltage supplied to the active electric control unit and the voltage supplied to the non-active electric control unit; and
determine that, if the difference between the voltage supplied to the active electric control unit and the voltage supplied to the non-active electric control unit is greater than a predetermined threshold, the abnormality is detected in the voltage supplied to the active electric control unit.

13. The motor control system of claim 10, wherein the one or more controllers are configured to determine that if the voltage supplied to the active electric control unit is less than a predetermined threshold, the abnormality is detected in the voltage supplied to the active electric control unit.

14. A method for controlling a motor control system comprising a motor comprising a plurality of motor windings, a plurality of power sources, a plurality of electric control units comprising active and non-active electric control units and electrically connected with the motor to control the motor, each of the electric control units comprising an inverter electrically connected with a respective power source, the method comprising:
monitoring whether an abnormality is detected in a voltage supplied to the non-active electric control unit;
in response to a detection that the abnormality is detected in the voltage supplied to the non-active electric control unit, isolating current of the active electric control unit to an inverter of the active electric control unit; and
after the current of the active electric control unit is isolated to the inverter of the active electric control unit, electrically disconnecting the non-active electric control unit from the active electric control unit and/or the motor.

15. The method of claim 14, further comprising, after the non-active electric control unit is electrically disconnected from the active electric control unit and/or the motor, releasing the active electric control unit from the isolation of the current of the active electric control unit to the inverter of the active electric control unit so that the active electric control unit controls the motor.

16. The method of claim 14, wherein the monitoring of whether the abnormality is detected in the voltage supplied to the non-active electric control unit comprises:
monitoring a difference between a voltage supplied to the active electric control unit and the voltage supplied to the non-active electric control unit; and
determining that, if the difference between the voltage supplied to the active electric control unit and the voltage supplied to the non-active electric control unit is greater than a predetermined threshold, the abnormality is detected in the voltage supplied to the non-active electric control unit.

17. The method of claim 14, wherein:
each of the electric control units comprises a phase disconnector connected between the motor and the inverter of each of the electric control units,
the electrically disconnecting of the non-active electric control unit from the active electric control unit and/or the motor comprises, after the current of the active electric control unit is isolated to the inverter of the active electric control unit, opening the phase disconnector of the non-active electric control unit to electrically disconnect the non-active electric control unit from the active electric control unit and/or the motor.

18. The method of claim 14, wherein the isolating of the current of the active electric control unit to the inverter of the active electric control unit comprises, in response to the detection that the abnormality is detected in the voltage supplied to the non-active electric control unit, making a duty cycle of the active electric control unit zero.

19. The method of claim 14, wherein:
each of the electric control units comprises first switches and second switches, wherein a respective one of the first switches and a respective one of the second switches are paired with each other, and a respective one of the motor windings is connected to between a respective one of the first switches and a respective one of the second switches, and
the isolating of the current of the active electric control unit to the inverter of the active electric control unit comprises, in response to the detection that the abnormality is detected in the voltage supplied to the non-active electric control unit, closing the second switches of the active electric control unit.

20. The method of claim 14, further comprising, in response to a determination that the detected abnormality in the voltage supplied to the non-active electric control unit is removed, restoring electric connection of the non-active electric control unit to the active electric control unit and/or the motor.

* * * * *